United States Patent [19]
Hoenninger, III

[11] Patent Number: 5,465,361
[45] Date of Patent: Nov. 7, 1995

[54] MICROCODE LINKER/LOADER THAT GENERATES MICROCODE SEQUENCES FOR MRI SEQUENCER BY MODIFYING PREVIOUSLY GENERATED MICROCODE SEQUENCES

[75] Inventor: John C. Hoenninger, III, Oakland, Calif.

[73] Assignee: The Regents of the University of California, Berkeley, Calif.

[21] Appl. No.: 165,534

[22] Filed: Dec. 13, 1993

Related U.S. Application Data

[63] Continuation of Ser. No. 579,631, Sep. 10, 1990, abandoned.

[51] Int. Cl.$^6$ ..................................................... G06F 9/30
[52] U.S. Cl. ........................ 395/700; 324/309; 324/312; 395/500; 364/DIG. 1
[58] Field of Search .................................. 324/309, 312; 395/500, 700

[56] References Cited

U.S. PATENT DOCUMENTS

| | | | |
|---|---|---|---|
| 4,667,290 | 5/1987 | Goss et al. | 364/200 |
| 4,707,661 | 11/1987 | Hoenninger, III | 324/309 |
| 4,812,981 | 3/1989 | Chan et al. | 364/200 |
| 4,845,613 | 4/1989 | Netter et al. | 364/200 |
| 4,870,397 | 9/1989 | Soto et al. | 340/747 |
| 4,912,633 | 3/1990 | Schweizer et al. | 364/200 |
| 4,947,315 | 8/1990 | Sokolow et al. | 395/700 |
| 4,992,971 | 2/1991 | Hayashi | 364/900 |
| 5,025,391 | 6/1991 | Filby et al. | 364/513 |
| 5,038,296 | 8/1991 | Sano | 364/513 |
| 5,099,233 | 3/1992 | Keenan | 340/825.72 |
| 5,121,498 | 6/1992 | Gilbert et al. | 395/700 |

OTHER PUBLICATIONS

Clark, "Pulsed Nuclear Resonance Apparatus," 35 *Review of Scientific Instruments*, No. 3, p. 316, (Mar. 1964).
Dick, "A Pulse Programmer for High–Power Nuclear Resonance," 48 *Journal of Physics E: Scientific Instruments*, p. 1054, (1976).
Conway et al, "Circuit for A Digital Pulse Programmer," 48 *Rev. Sci. Instrum.*, No. 6, p. 656, (Jun. 1977).
Caron, "A New Programmable Timer Designed for Pulsed NMR," 31 *Journal of Magnetic Resonance*, p. 357 (1978).
Case et al, "Versatile Pulse Sequence Generator for Pulse NMR," 35 *Journal of Magnetic Resonance*, p. 439, (1979).
Dart, "Highly Flexible Pulse Programmer for NMR Applications," 51 *Rev. Sci. Instrum.*, No. 2, p. 224, (Feb. 1980).
Thomann et al, "Digital Pulse Programmer for An Electron–spin–resonance Computer–controlled Pulsed Spectrometer," 55 *Rev. Sci. Instrum.*, No. 3, p. 389, (Mar. 1984).
Jensen et al, "A Universal Pulse Programmer for NMR Imaging," Proceedings of the Third Annual SMRM, p. 379, (1984).

(List continued on next page.)

Primary Examiner—Ken S. Kim
Attorney, Agent, or Firm—Nixon & Vanderhye

[57] ABSTRACT

An extremely fast and efficient Linker for a Magnetic Resonance Imaging (MRI) system Nuclear Magnetic Resonance (NMR) pulse control sequencer efficiently derives subsequent blocks of microcode to be loaded by using the contents of a memory buffer containing previously loaded microcode as a template, Most of the template is reused "as is". Only the relatively few field values in the microinstructions which change from one signal generation process, or cycle, to the next are replaced with new values. Offsets are tabulated of instructions which have associated multi-entry cycle indexed program change table (PCT) values. When further code is to be linked and loaded, the linker accesses the PCTs based on the table and to inserts new values into the appropriate instruction fields. The microcode memory image may be continuously maintained in a host memory buffer and re-edited successive times. The Fast Linker provided by the present invention is capable of continually loading microcode into a sequencer writable control store, and is fast enough to run under a time shared operating system at the same time a higher priority data acquisition and display process is executing.

64 Claims, 21 Drawing Sheets

OTHER PUBLICATIONS

Sidky et al, "State–machine Digital Pulse Generator," 59 *Rev. Sci. Instrum.*, No. 5, p. 806, (May 1988).

Wachter et al, "Enhanced State–machine Pulse Programmer for Very–high–precision Pulse Programming," 59 *Rev. Sci. Instrum.*, No. 10, p. 2285, (Oct. 1988).

F H. Al–Riahi, "Software–controlled Memory Duplication," 9*Microprocessors and Microsystems,* No. 1, (Jan./Feb. 1985).

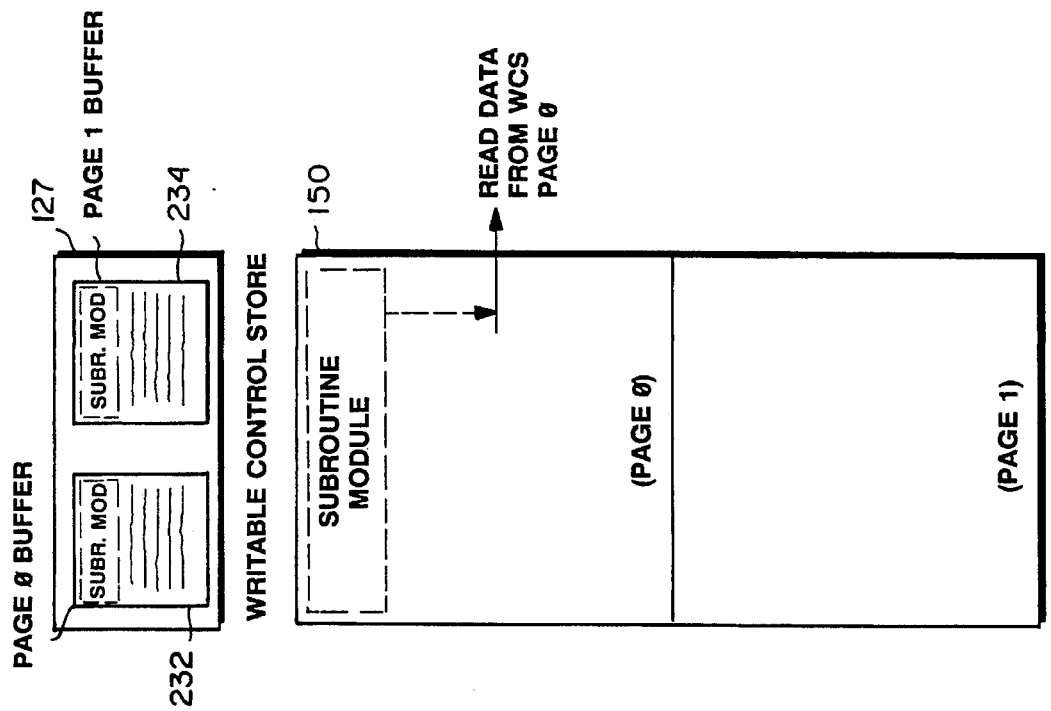
Fig. 3B (START SEQUENCER)
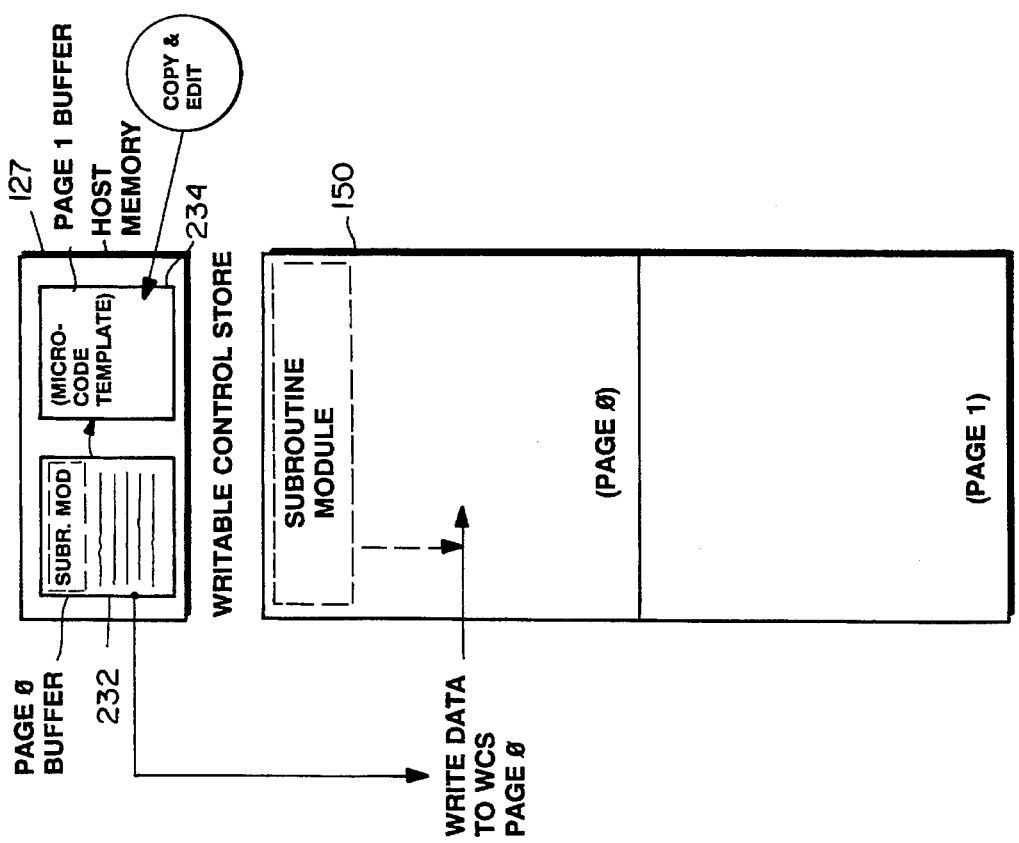
Fig. 3A (LOAD SEQUENCER, SEQUENCER NOT RUNNING)

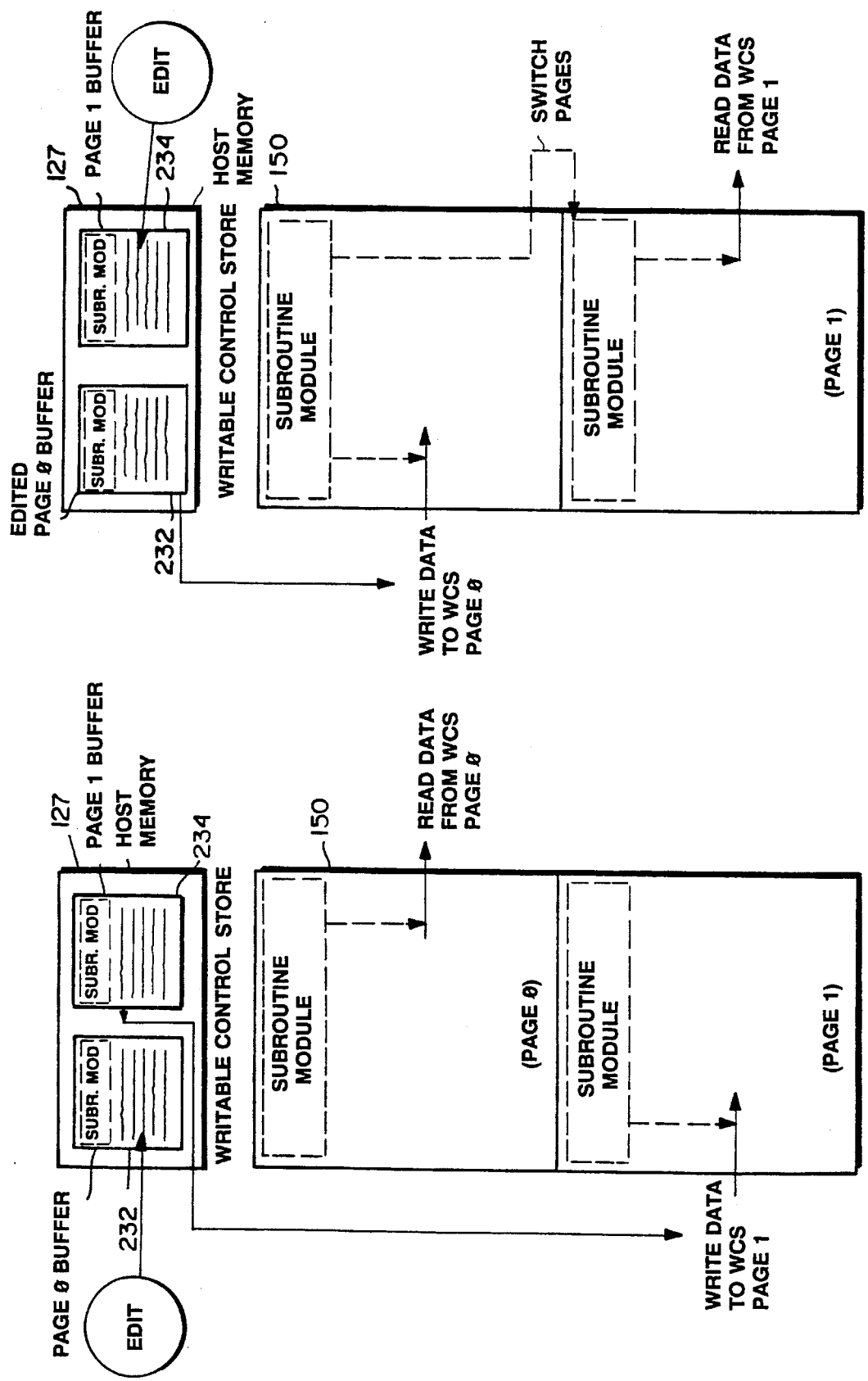

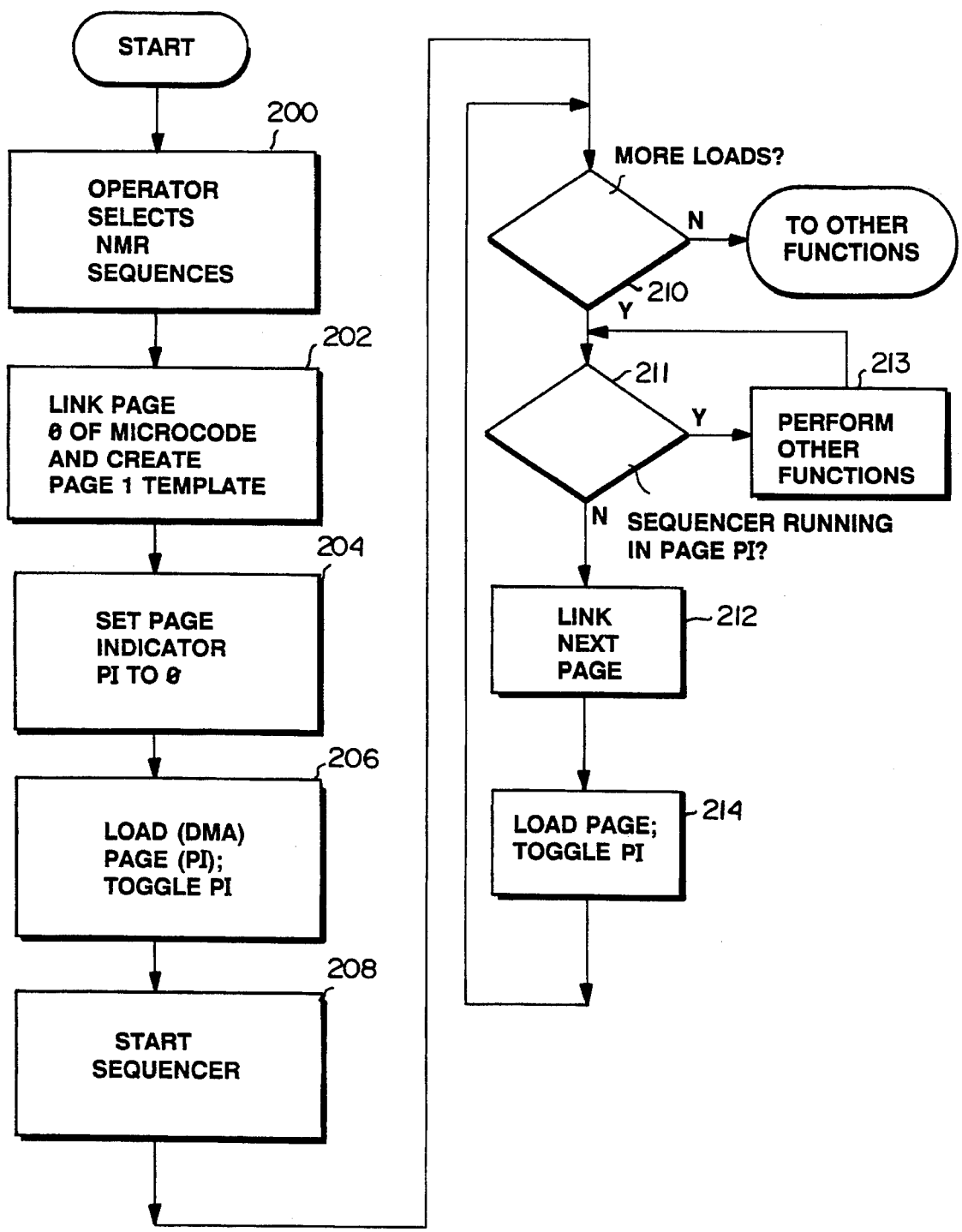
Fig. 4  HOST PROCESSING ROUTINE

MICROCODE LINKER/LOADER THAT GENERATES MICROCODE SEQUENCES FOR MRI SEQUENCER BY MODIFYING PREVIOUSLY GENERATED MICROCODE SEQUENCES

This is a continuation of application Ser. No. 07/579,631, filed 10 Sep. 1990, now abandoned.

CROSS-REFERENCES TO RELATED PATENT APPLICATIONS

This patent application is related to the following copending commonly-assigned patent applications:

Ser. No. 07/551,798 of Hoenninger filed 12 Jul. 1990 entitled "MAGNETIC RESONANCE IMAGING SEQUENCER GATING" now issued U.S. Patent No. 5,291,610 (Attorney Docket 89-39);

Ser. No. 08/032,647 of Hoenninger filed 17 Mar. 1993, entitled "CONTROL INTERFACE FOR AN NMR SYSTEM" (Attorney Docket No. 89-59); and Ser. No. 07/571,258 of Zeilenga et al filed 23 Aug. 1990 entitled "CONTINUALLY LOADABLE MICROCODE STORE FOR MRI CONTROL SEQUENCERS" (Attorney Docket No. 89-108) now issued U.S. Pat. No. 5,144,242.

FIELD OF THE INVENTION

This invention relates to nuclear magnetic resonance (NMR) techniques and more particularly to magnetic resonance imaging (MRI). Still more particularly, the present invention relates to microcoded pulse sequence generators (so-called "sequencers" or "pulse programmers") for MRI equipment. In still more detail, the present invention relates to a process for machine generating machine-executable state-change instructions for the sequence controller of a multi-slice magnetic resonance imaging system and to an arrangement for rapidly and efficiently linking microcode for such a sequence controller.

BACKGROUND AND SUMMARY OF THE INVENTION

The fundamentals of the MRI experiment are well known. Briefly (and hopefully without undue oversimplification), in a typical MRI system an object 10 (see FIG. 2) to be imaged (e.g., a portion of the human body) is placed in an external static magnetic field gradient. Protons within the object tend to align their spins in accordance with the magnetic field direction. The object is excited by one or more RF excitation pulses of appropriate frequency, timings and durations (as one example, so-called "spin-echo" type pulse sequences may be used). The RF excitation pulses generated at the Larmour frequency cause the protons to precess their spins. When each RF pulse is switched off, the nuclei precess back toward their equilibrium position and in this relaxation process emit an NMR response that can be detected by an RF receiver.

As is well known, different pulse sequences can be used to obtain different results. A pulse sequence generator (hereafter "sequencer") portion of the system (e.g., often a high-speed hardware state machine based on a bit slice processor architecture) provides the sequence of control signals that controls the operation of the RF transmitter(s), RF receiver(s) and gradient magnet(s). The sequencer must reliably provide a high degree of flexibility (e.g., to provide generation of different desired pulse sequences) as well as adequate time resolution and other important features.

The following is a non-exhaustive listing of possibly representative prior patents and articles relating to NMR sequencers:

Hoenninger III U.S. Pat. No. 4,707,661 (1987);

Netter et al U.S. Pat. No. 4,845,613 (1989);

Clark, "Pulsed Nuclear Resonance Apparatus," 35 *Review of Scientific Instruments*, No 3, p. 316 (March 1964);

Dick, "A Pulse Programmer for High-Power Nuclear Resonance," 9 *Journal of Physics E: Scientific Instruments*, p. 1054 (1976);

Conway et al, "Circuit for A Digital Pulse Programmer," 48 *Rev. Sci Instrum.*, No 6, p. 656 (Jun. 1977);

Caron, "A New Programmable Timer Designed for Pulsed NMR," 31 *Journal of Magnetic Resonance*, p. 357 (1978);

Case et al, "Versatile Pulse Sequence Generator for Pulse NMR," 35 *Journal of Magnetic Resonance*, p. 439 (1979);

Dart, "Highly Flexible Pulse Programmer for NMR Applications," 51 *Rev. Sci. Instrum.*, No 2, p. 224 (February 1980);

Thomann et al, "Digital Pulse Programmer for An Electron-Spin-Resonance Computer-controlled Pulsed Spectrometer," 55 *Rev. Sci. Instrum.*, No 3, p. 389 (March 1984);

Jensen et al, "A Universal Pulse Programmer for NMR Imaging," Proceedings for the Third Annual SMRM, p. 379 (1984);

Sidky et al, "State-machine Digital Pulse Generator," 59 *Rev. Sci. Instrum.*, No 5, p. 806 (May 1988); and Wachter et al, "Enhanced State-machine Pulse Programmer for Very-High-Precision Pulse Programming," 59 *Rev. Sci. Instrum.*, No 10, p. 2285 (October 1988).

As described in some of the documents listed above, a sequencer may comprise a microcoded sequential state machine, with each different state providing different output control signals to control different portions of the NMR equipment (e.g., RF transmitter and receiver, gradient coils, etc.). The "next state" to which the sequencer transitions is typically determined by the sequencer previous state. The time at which such a transition occurs is generally variable (since different NMR equipment "states" last for different durations within a typical NMR pulse sequence) and typically may also be determined by the previous state. Different microcode may by loaded into a control store (WCS) within the sequencer to define different pulse sequences.

Thus, MRI microcoded sequencers generally include a writable control store (WCS) containing a sequence of microinstructions that define a corresponding sequence of machine states. The microinstructions are, in one sense, a computer program executed by the sequencer. This microcode computer program specifies sequencer outputs (e.g., to control portions of the MRI system such as the RF transmitter, the gradient coils, etc.) and also specifies the duration of such sequencer outputs. In addition, the microcode specifies an ordered sequence of sequencer machine states—by providing a corresponding ordered "in line" sequence of microinstructions executed one after another (e.g., in the order in which the microinstructions are stored in the control store) and/or by providing conditional or unconditional "branching" microinstructions which cause particular microinstruction(s) to be performed in an order different from the order in which the microinstructions are stored in the control store.

Since the sequencer control store is writable (e.g., by a host computer linked to the sequencer), different NMR pulse sequences can be specified by simply downloading different microinstructions into the sequencer control store. Thus, different microinstruction sequences corresponding to hundreds of different NMR pulse sequences may be maintained on the host computer's mass storage (e.g., hard disk). Briefly, software executing on the host computer permits an operator to select (or create) particular sequencer microcode routines corresponding to particular experiments. The host computer then "links" and downloads the selected ("main") routines into the sequencer writable control store for execution by the sequencer. The host computer may download, along with the actual microcode routines, additional routines and data (e.g., commonly used subroutines, reference tables and the like) that must be present in the writable control store (and linked with the main routines) in order for the selected microcode routines to run.

U.S. Pat. No. 4,707,661 to Hoenninger, III et al (1987) (hereafter "Hoenninger '661") describes a highly successful technique for efficiently generating sequencer state change microinstructions. The entire disclosure (including the FIGURES) of Hoenninger '661 are hereby expressly incorporated herein by reference. The preferred embodiment Fast Linker disclosed and claimed in the subject application is an extension of the prior Linker design disclosed in Hoenninger '661. The following discussion briefly summarizes some (although not all) of the more important details disclosed in the Hoenninger '661 patent that relate to the arrangement disclosed and claimed in the subject application. The reader is referred to that prior Hoenninger '661 patent for additional details relating to that prior art microcode generation technique.

As is well known, the term "linker" or "link editor" as used in computer science typically refers to a program (or system) that resolves cross references (e.g., "external" references to "global" variables shared among several different programs and/or subroutines, address references permitting a one routine to call another routine, etc.) between routines (and subroutines) that have been assembled or compiled separately. A "linking loader" resolves such cross-references and loads the "linked" programs and subroutines into memory for execution. Although the microcode Linker/Loader described in the Hoenninger '661 patent resolves cross references, it performs many other tasks and functions (e.g., handling of external loop specifications and directives) that are generally non-analogous to non-MRI Linker functions.

Hoenninger '661 describes the use of program change tables (hereafter referred to as "PCTs") combined with techniques for grouping and replicating program segments with indexed symbolic addresses to greatly reduce the number of lines of microcode that must be written for a typical MRI sequence.

This earlier described technique relies upon a decomposition of MRI sequences into such program code "templates" (i.e., program segments) which encode the unique sequence of machine states required for only one set of spin echoes for one slice. The code templates are then logically associated with program change tables (PCTs) comprising lists of parameter values which may then be arbitrarily specified for any line in a line of microcode. This association permits a multiplicity of template implementations to be generated in a completely predictable way. Hoenninger '661 thus teaches that instead of generating each slice-specific portion of sequencer microcode independently, it is possible (due to the high degree of redundancy and similarity in MRI sequencer microcode from one program segment to the next) to replicate entire blocks of microcode based on a more general model or "template" of the microcode—and to merely replicate microcode program segments (with altered MRI parameter values and addresses as appropriate) to provide appropriate additional slice-specific program segments. Hoenninger '661 teaches embedding symbolic reference pointers within the template to refer to parameter values to be obtained externally from PCTs, but also recognizes that the parameter values themselves can be utilized and simply changed from one execution pass to the next.

The MRI Linker described in Hoenninger '661 accepts an "Linker Control Statement" as an input data string. The Hoenninger '661 patent describes the general format of such an input data string. This input data string is parsed to extract main routine and subroutine entries, and to ascertain table identifications and ranges corresponding to slice-specific entries. The microcode is generated in response to such Linker statements.

Slice-specific program segments cannot simply be re-executed for different slices because of the different parameters which vary from one slice to the next. Hoenninger '661 teaches replicating such slice-specific program segments by: (a) changing slice-specific parameter values as may be required for specific slices, and (b) appropriately indexing symbolic address arguments associated with "jump to subroutine" or "jump" instructions as well as the symbolic address(es) of the associated slice-specific program segments. Other program segments (e.g., those associated with sampling) are not replicated but are instead simply stored once at a predetermined place in memory and accessed (e.g., as a subroutine) by a fixed symbolic address at any point in the program.

During execution of the Linker program, any encountered subroutines that are not slice-specific are treated as true subroutines which are not replicated. On the other hand, all program segments designated as being "slice-specific" are replicated in a predetermined order (as specified by the input Linker Control Statement)—while indexing the corresponding symbolic addresses associated with the replicated program segments and also indexing the appropriate referenced PCT entries in a predetermined sequence so as to maintain proper correspondence between slice-specific main programs and subroutines in each replicated segment.

FIGS. 6A–6C of Hoenninger '661 illustrate exemplary "Linker" program control steps for generating microcode using the program change tables and templates mentioned above. These FIGURES are set forth herein as prior art FIGS. 1A–1C.

Briefly, after entering the Linker Program at 600 (where a "cycle" counter may be set to a content of "1"—this cycle counter keeping track of "phase encoding cycles" as will be understood by those skilled in this art), the slice-specific routines are expanded at 604 by (a) replicating slice-specific segments appearing within parentheses in an indicated order using indexed symbolic addresses and indexed parameters from the referenced PCTs (program change tables), and (b) not replicating subroutine segments not within the parentheses of the slice-dependent portion of the inputted linker control statement and also not indexing certain symbolic addresses associated with this subset of subroutines. In addition, the Linker of FIGS. 1A–1C expands slice-specific main program segments appearing within parentheses of the Linker Control Statement at 606 in a predetermined order (e.g., as specified by the syntax of the Linker Control Statement) using indexed symbolic addresses and indexed parameters from referenced PCTs (except for the predetermined subset of non-slice-specific subroutine segment references which are related as true and conventional subroutines without indexed symbolic addresses). Other program segments designated in the Linker Control Statement are also appropriately linked before the cycle counter is tested. Unless the last cycle has been linked, the cycle counter is incremented and the main program base memory location is updated and control is passed back to the beginning of routine 606. Once microcode for the last cycle of operation has been properly linked, the control is passed to block 614 where the final line of microcode is generated including a "stop" code, and an exit is taken from the Linker Program at block 616 (whereupon the generated microcode may be loaded and executed if desired).

The Linker described in the Hoenninger patent has (e.g., due to it high efficiency and speed) been highly successful in its own right. However, further improvements are possible. For example, it has become highly desirable to provide even more efficient and rapid linking of MRI sequence controller microcode than is provided by the Linker described in Hoenninger '661.

FIG. 1D describes an exemplary prior art sequencer microcode reloading technique used in the past in conjunction with the Liner described in Hoenninger '661. At block A (before the sequencer is started), the host computer links and loads the entire control store with micro-instructions (e.g., by performing the program control instructions shown in prior art FIGS. 1A–1C). When the sequencer is started (blocks B and C), the sequencer repetitively reads from the control store and executes the micro-instructions stored within the store—thus generating NMR pulse sequences for a desired NMR experiment. In more complex experiments the sequencer will reach the end of the control store before the experiment has terminated ("Y" exit of decision block C) and require micro-instructions that are not yet resident in the store. When the sequencer reaches the end of the control store, it suspends operations momentarily (block D) and requests the host to rewrite the control store. The host links an entire new sequencer control store-sized block of microcode (e.g., once again performing all of the instructions set forth in routine 606 shown in FIGS. 1A–1C, the symbol tables and PCTs generated by routine 604 preferably being retained by the host from before; block E) while the sequencer is executing the previously loaded microcode. It begins loading the sequencer memory as soon as it is requested to do so if linking has been completed, otherwise loading is delayed.

The sequencer can be designed so that the host can very rapidly load the writable control store (e.g., using direct memory access (DMA) techniques). Rewriting the control store at block E may thus introduce less than a one second delay if linking is completed when the sequencer requests reloading. Once the host has successfully rewritten the sequencer control store, the sequencer may resume operations at the beginning of the control store (or at some other predetermined transfer point) (block F). The writable control store can be reloaded as many times as necessary to cause the sequencer to execute the entire control program.

Unfortunately, this FIG. 1D technique generates some significant problems in the real time control context of an NMR sequencer. The regular RF stimulations provided during MRI imaging cause the NMR-sensitive molecules within the body being imaged to enter a dynamic steady state different from the unexcited steady state. If these regular stimulations are interrupted, relaxation causes the NMR-sensitive molecules to move away from the dynamic steady state toward their natural (unexcited) steady state. Interrupting the NMR pulse sequence to link microcode and reload the writable control store interrupts the regular stimulations.

A technique known as "spin conditioning" has been used to stimulate the body back to dynamic steady state after such an interruption (and before data acquisition resumes). However, spin conditioning wastes time and may also not be entirely effective in avoiding image degradation caused by the interruption. This is due to the fact that the exponential time constants of the spins in some human body tissues are 1–2 seconds and spin conditioning is not usually performed for the 5–10 seconds required to return to steady state. There may also be eddy currents in the magnet with time constants in excess of 1 second. Since the time between reloads of the control store is constant in most cases, the disruption is periodic and the Fourier Transform of the resulting data is sensitive to this periodic perturbation of the data, resulting in image artifacts. A disruption near the zero phase encoding data acquisition will cause especially strong effects. Interruption due to control store loading should be avoided in order to prevent loss of steady state in the body which can lead to artifacts and noise in the acquired image data—and thus cause image degradation.

Copending, commonly-assigned application Ser. No. 07/571,258 of Zeilenga et al entitled "Continuously Loadable Microcode Store for MRI Control Sequencers" (attorney docket no. 89-108), now issued U.S. Pat. No. 5,144,242 describes an MRI pulse sequencer which permits microcode to be continually loaded substantially without interruption of MRI pulse sequences being generated by an associated MRI system—thus avoiding the image degradation and other problems resulting from interrupting the NMR pulse sequence to load microcode. However, the availability of a continually loadable MRI microcoded sequencer introduces speed and other requirements that may not be fully satisfied by the Linker described in the Hoenninger '661 patent.

It would be possible to use the Linker earlier described in the Hoenninger '661 patent to link and store (e.g., on mass storage) all of the required sequencer microcode ahead of time—and to then simply load the pre-generated microcode from memory and/or mass storage as required. Unfortunately, such an arrangement would require a great deal of latent processing time between user inputting of a "link and load" command and the actually beginning of sequencer execution. In order to increase overall MRI system throughput and flexibility, it would be highly desirable to drive such a continually loadable sequencer with a host processor that is capable of continually generating microcode "on the fly" for loading into the sequencer. Thus, it would be desirable for the host processor to be capable of rapidly linking and loading replacement pages of sequencer microcode in real time as needed, where the link time is always less than the execution time of a page of microcode. Through such cooperation between a continually loadable sequencer and a linker continually generating microcode, it would be possible to provide NMR pulse sequences of arbitrarily long duration without interruption—and without long startup latency.

One possible technique to accomplish such continual microcode linking is to execute the Linker of the type described in the Hoenninger '661 patent with a host processor that has sufficient processor resources dedicated to the linking function. However, relatively modest minicomputers are not capable of generating, linking and loading microcode at a sufficiently rapid rate to keep up with a continually loadable sequencer in the case of the fastest sequences.

It is also a design goal to eliminate the extra cost and added complexity of a dedicated linker processor. State-of-the-art MRI system design has moved towards a single processor architecture. In such a single processor architecture, a single main processor (e.g., a minicomputer) performs all data processing functions associated with data acquisition, reconstruction and display—as well as all data processing functions associated with microcode linking and loading (and other sequencer support). Unfortunately, data acquisition, reconstruction and display tasks are extremely processor intensive. The processor-intensive Linker described in the Hoenninger '661 patent cannot be efficiently, timely executed on a continual basis by a cost-effective host processor also engaged in simultaneous data acquisition and display (at least using current cost-effective minicomputer technology).

During the time the sequencer is operating, the host processor is busy acquiring data in real time (and generally also reconstructing and preferably displaying images). There are generally few processor resources left over for performing functions such as microcode linking. To be successful in such a host computer multitasking environment, a microcode linker/loader must place only minimal demands on the host processor during the time data is being acquired and/or displayed—while nevertheless still being capable of continually generating an arbitrary amount of microcode "on the fly" in real time so as to permit sequencer reloading while the sequencer is running.

The present invention provides an extremely fast and efficient microcode Linker that exerts minimal demands on the host processor once data acquisition has begun.

An important feature of the Fast Linker provided by the present invention is the use of memory image templates which can be efficiently constructed given the large amount of the microcode which is static from one signal generation process to the next. The collection of data for an MRI image is essentially the collection of an interference pattern which is generated by performing successive sequences of operations on the spin lattice in the object being imaged. Each sequence of operations is very similar to the previous one. This fact is exploited to create sequencer memory image templates which can be linked before loading simply by inserting (changing) the relatively few microcode field values in the instructions of the sequence which change from one signal generation process, or cycle, to the next. A cycle of microcode in the present invention typically may control the generation of all spin echo signals for all slices for a single phase encoding value.

Briefly, the Linker provided by the present invention generates an initial block ("template") of microcode in a more efficient manner in accordance with the steps shown in prior art FIGS. 1A–1C (and in the manner disclosed in the prior issued Hoenninger '661 patent). This initial block of microcode is stored in a memory buffer, and may be downloaded into the microcoded sequencer at an appropriate time. The Fast Linker provided by the present invention provides a highly efficient technique for deriving subsequent blocks of microcode by using the contents of the memory buffer as a template, by changing only those few values that need to be changed, and by reusing most of the template "as is" for reloading the sequencer memory.

The size of the microcode set for a cycle is determined by the number of instructions in the main routines of the sequence. Typically, the MRI control store is large enough to contain many cycles of microcode. A table is constructed at the time the microcode template is created in the load buffer which records the offsets of all instructions which have associated multi-entry cycle indexed program change table (PCT) values. When further code is to be linked and loaded, the only operation necessary before loading is to access the PCTs in a sequence data base based on the list in the table and to then insert the values so obtained into the appropriate instruction fields.

For example, to create a subsequent block of microcode, the initially-created microcode memory image may be edited to generate further microcode to be downloaded into the sequencer control store. Such "editing" does not need to edit addresses in the preferred embodiment—since in accordance with a further feature of the present invention, the edited image is written into the same area of the sequencer control store memory space the initially generated block was loaded into (and the addresses set forth in the microcode block may thus stay constant from one loading to the next). Rather, within the memory buffer only certain (e.g., phase encoding cycle-specific) values such as jump limits, clock times, gradient values are changed to generate a subsequent block of microcode.

Such limited editing of the existing microcode memory image can be performed extremely rapidly and efficiently by the host processor. The preferred embodiment provides efficient means (e.g., a tabular pointer and offset arrangement) to keep track of the information that must be changed to produce a subsequent page of microcode, and new values to be inserted into the memory image can be efficiently obtained from PCTs (program change tables) of the type described in the prior-issued Hoenninger '661 patent.

In the preferred embodiment, the microcode memory image may be continuously maintained in a host memory buffer and re-edited successive times (each time replacing the same limited set of old cycle-specific values with a new set of values) such that the host computer only needs to maintain a single copy of the microcode memory image for each memory page. Further efficiency is gained by repetitively editing the same microcode memory image in place and then downloading the edited memory image directly from the memory buffer to the sequencer (thus avoiding copying from one memory buffer to another and avoiding copying between mass storage and memory).

Continual linking and loading of the sequencer microcode control store when the sequencer is running ensures that the sequencer outputs are not interrupted even though the control store is not large enough to store all of the microcode needed to execute an MRI sequence. The Fast Linker provided by the present invention is capable of continually loading a sequencer writable control store and is fast enough to run under a time shared operating system at the same time a higher priority data acquisition and display process is executing. The preferred embodiment Fast Linker is (as one example) quick enough on the MicroVAX II (about 100 ms per 1024 lines of microcode linked when running as the sole process) that it does not have to run as a "time critical" process (which greatly improves the performance and responsiveness of the overall MRI system). This speed also allows fast continuous sequences which generate, reconstruct and display an image periodically (e.g., every 1 sec) for long periods of time to run successfully on a MicroVAX II (which provides a relatively modest CPU throughput less than 1 Mips).

BRIEF DESCRIPTION OF THE DRAWINGS

These and other features and advantages of the present invention may be better and more completely understood by referring to the following detailed description of a presently preferred exemplary embodiment in conjunction with the drawings, of which:

FIGS. 3A, 3B, 3C, and 3D are schematic/graphical illustrations of sequencer microcode Fast Linking provided by the FIG. 2 preferred embodiment;

FIG. 4 is a schematic flowchart of exemplary program control steps performed by the host processor shown in FIG. 2;

DETAILED DESCRIPTION OF PRESENTLY PREFERRED EXEMPLARY EMBODIMENTS

The overall architecture of a preferred embodiment NMR system 100 will first be described in conjunction with FIG. 2. Then, a high level description of a sequence of host computer operations used to provide fast linking of the microcode will be discussed in conjunction with FIGS. 3A–3D, 4 and 5A–5B. Following such discussion, a more detailed description of the presently preferred exemplary embodiment fast microcode linker will be presented in conjunction with FIGS. 6–7. Finally, a brief discussion of a suitable microcoded sequencer for use with the preferred embodiment Linker will be provided in connection with FIGS. 8–9.

I. Overall NMR System 100

Figure 2:
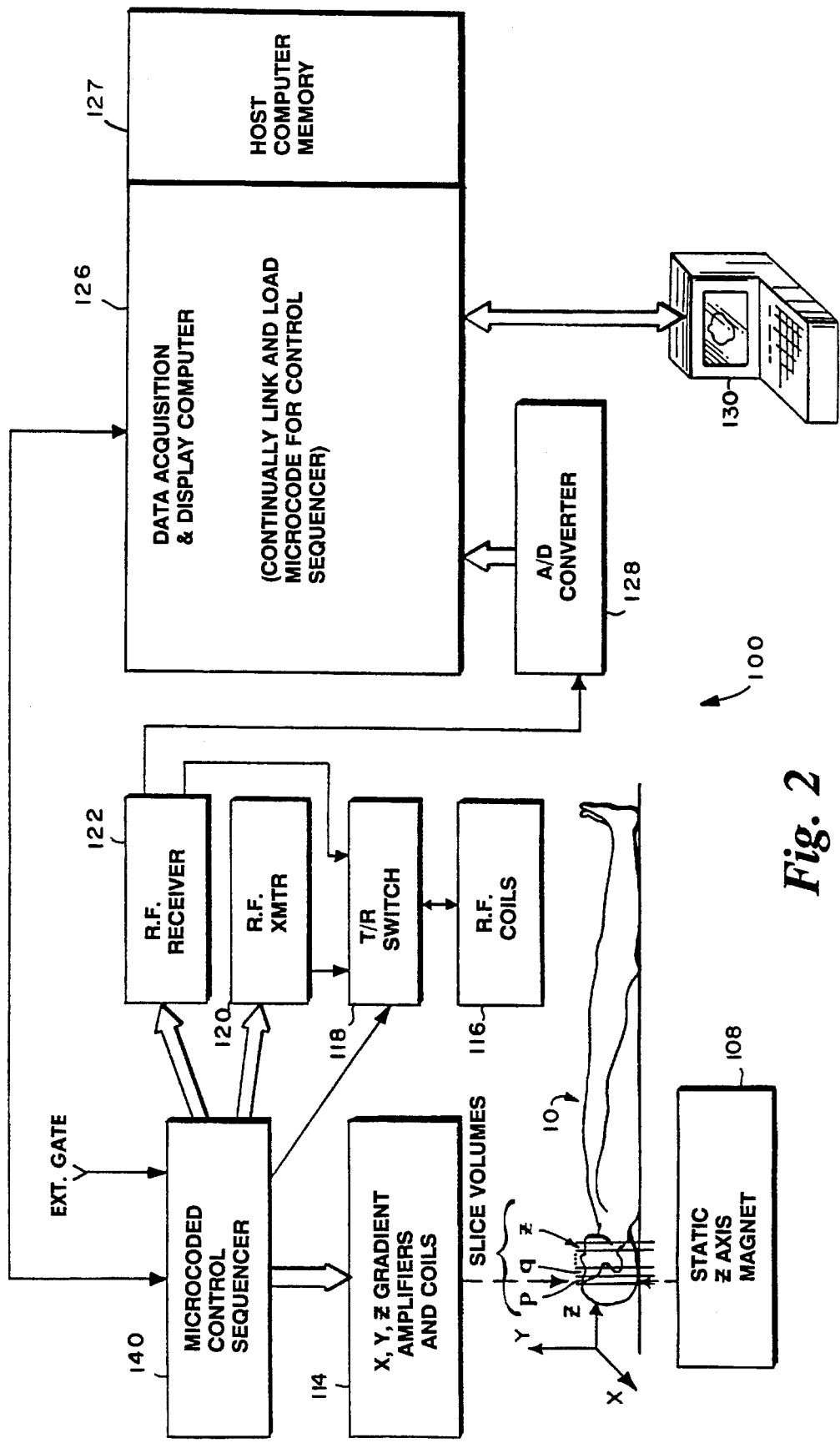
FIG. 2 is a high level block diagram of a presently preferred exemplary embodiment of an NMR system including a host processor with an improved Linker provided by the present invention.

The block diagram of FIG. 2 depicts the general architecture of an exemplary preferred NMR imaging system 100 of the type with which the microcode sequencer with continually loadable microcode store in accordance with the present invention may be used.

Typically, a human or animal subject (or any other object to be imaged) 10 is: placed within a static magnetic field. For example, the subject may lie along the z-azis of a static magnet 108 which establishes a substantially uniform magnetic field directed along the z-azis within the portion of the object 10 of interest. For example, contiguous parallel slice-volumes p,q . . . z may be located within the volume to be imaged. Gradients (e.g., a fixed weak z gradient) may be imposed within this z-axis directed magnetic field along mutually orthogonal x,y,z axes by a set of x,y,z gradient amplifiers and coils 114 to phase encode the resulting NMR response signals which are generally then read out with the gradients turned off. NMR RF signals are transmitted into the object 10 and NMR RF responses are received from the object via RF coils 116 connected by a conventional transmit/receive switch 118 to an RF transmitter 120 and RF receiver 122. As will be appreciated by those in the art, separate transmit and receive coils may be used in some installations, in which case the T/R switch 118 may not be needed.

All of the prior mentioned elements may be controlled, for example, by a microcoded control sequencer 140 which communicates with a data acquisition and display computer (hereafter "host processor") 126 (which includes a random access memory 127 along with various other conventional components as is well known). The latter host processor 126 may receive NMR responses via an analog-to-digital converter 128, analyze the received responses, and generate images of body 10 in real time. A CRT display and keyboard unit (terminal) 130 is typically also associated with the host processor 126.

As will be apparent to those in the art, such an arrangement may be utilized to generate desired sequences of magnetic gradient pulses and NMR RF pulses and to measure the desired NMR RF responses in accordance with stored computer programs.

In particular, host processor 126 maintains, on mass storage, a library of microcode routines corresponding to useful NMR pulse sequences. An operator may select (and also edit or otherwise manipulate) desired microcode routines from the library via terminal 130, and then command host processor 126 (e.g., by inputting "Linker Control Statements" via terminal 130) to assemble and link such microcode routines and load the resulting executable microcode into sequencer 140 for execution by system 100. The sequencer 140 controls, in real time, the gradient amplifiers and coils 114, the RF receiver 122 and the RF transmitter 120, so as to cause NMR pulse sequences to be generated. Host computer 122 receives the digitized RF NMR responses (via A/D converter 128) and processes those digitized responses (e.g., via image reconstruction and other conventional techniques) so as to provide, on terminal 130 (or other display), one or more images corresponding to body 10.

II. HIGH LEVEL DESCRIPTION OF MICROCODE LINKING AND LOADING

FIGS. 3A–3D are a sequence of schematic block diagrams which graphically illustrate the continual linking and loading of microcode for the FIG. 2 host processor 126 in cooperation with sequencer 140.

Referring to FIGS. 3A and 4 together, a human operator first selects the particular NMR pulse sequences to be performed by system 100 (e.g., by interacting with a menu driven software selection routine via terminal 130 to provide a Linker Control Statement) (FIG. 4, block 200). In response to such selections, host computer 126 retrieves one or more corresponding microcode routines and subroutines from mass storage and also retrieves tables and other data/routines required for execution of the retrieved routines.

Figure 1A:
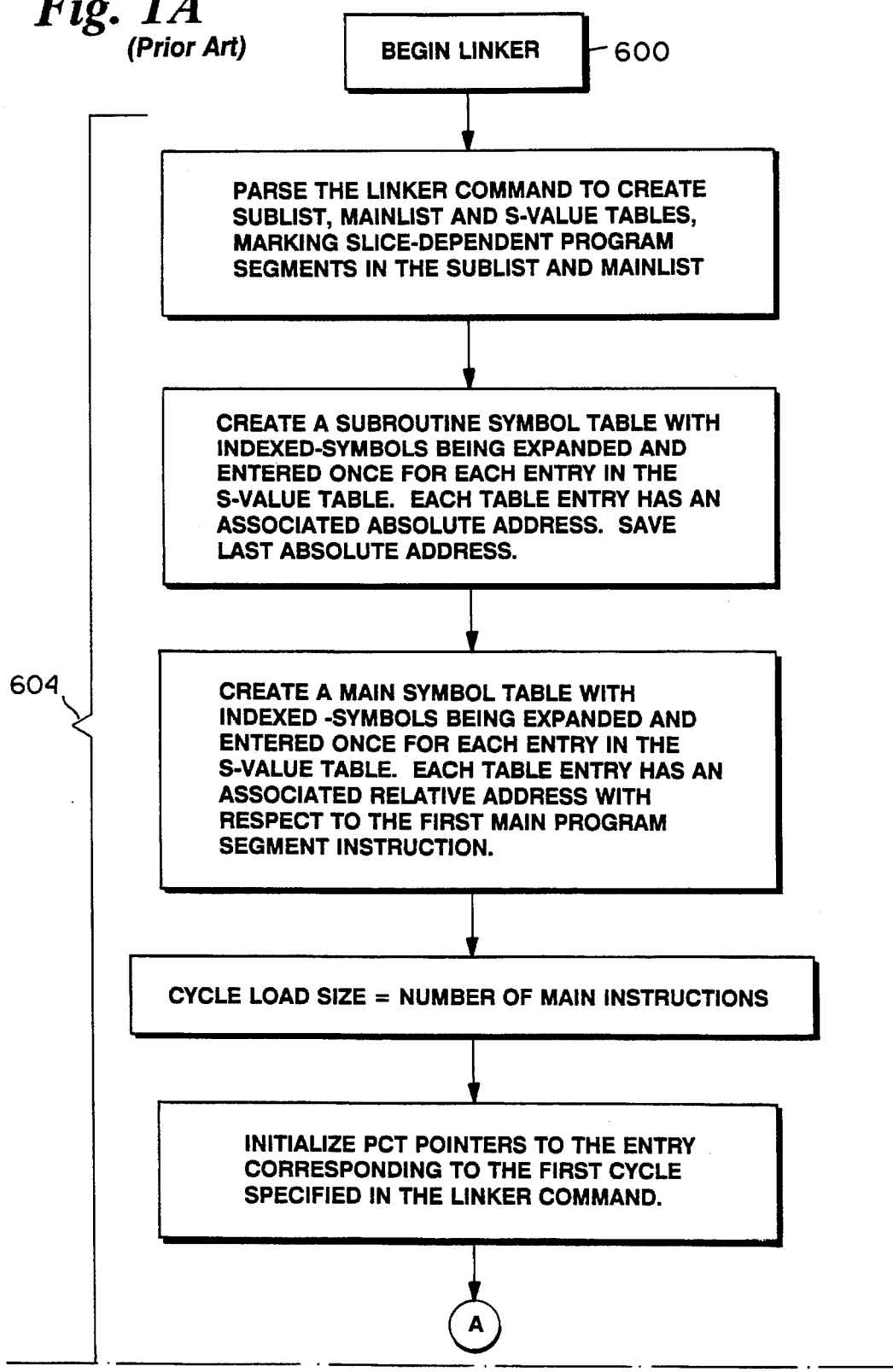
FIGS. 1A, 1B, 1C, and 1D are schematic diagrams in flowchart form of the microcode reload operation performed by an exemplary prior art NMR microcoded pulse sequencer.
Figure 1B:
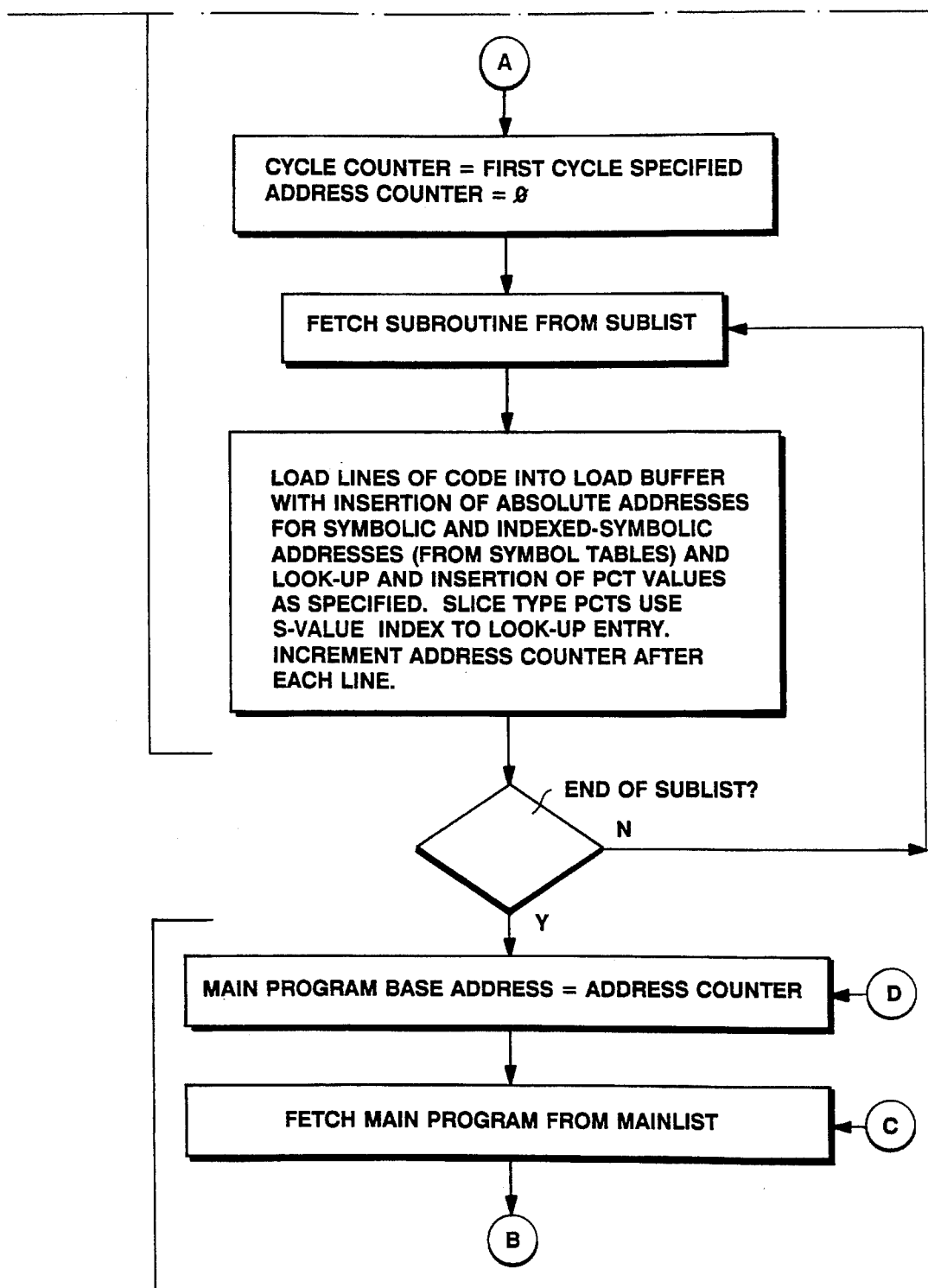
Figure 1C:
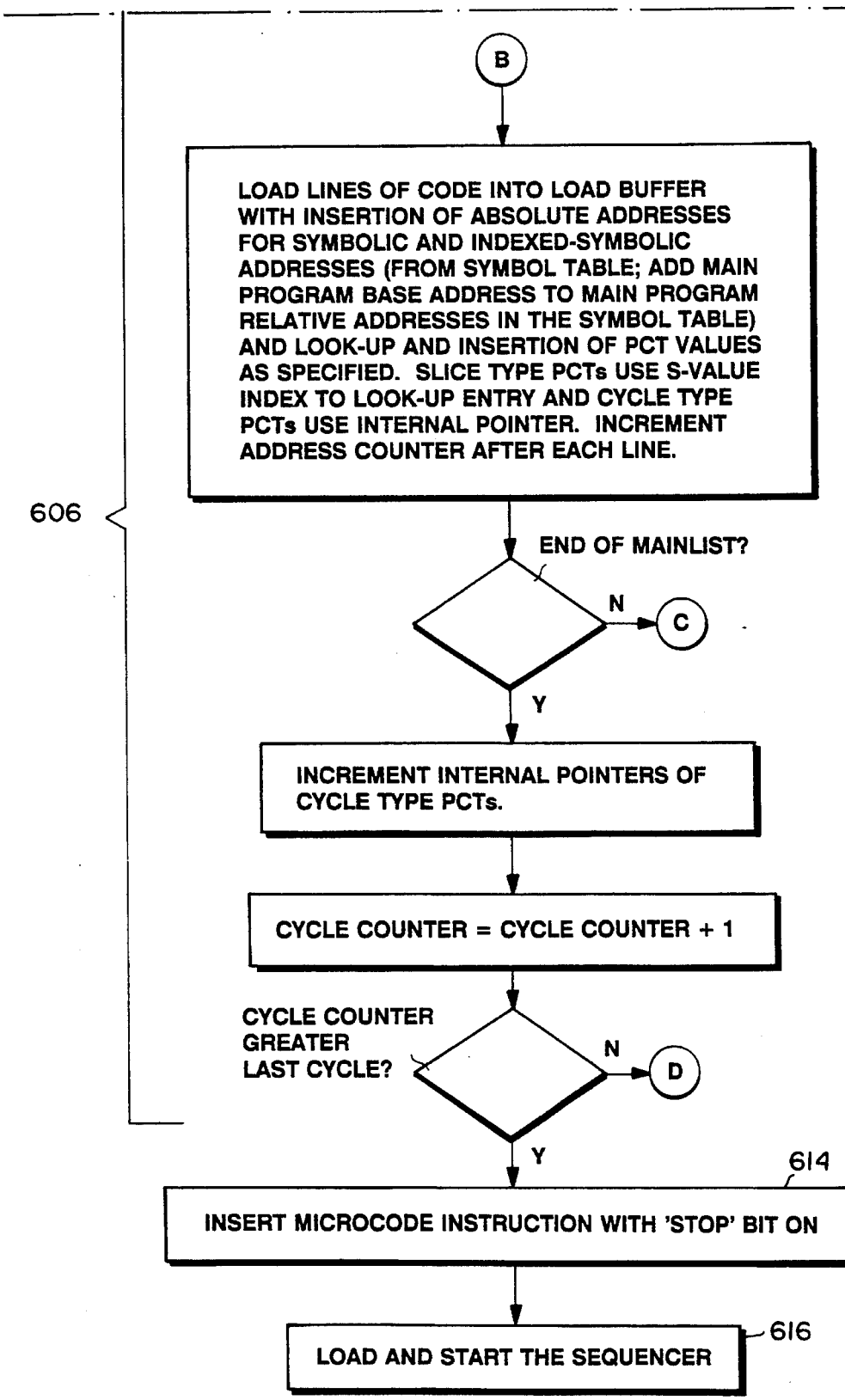
Figure 1D:
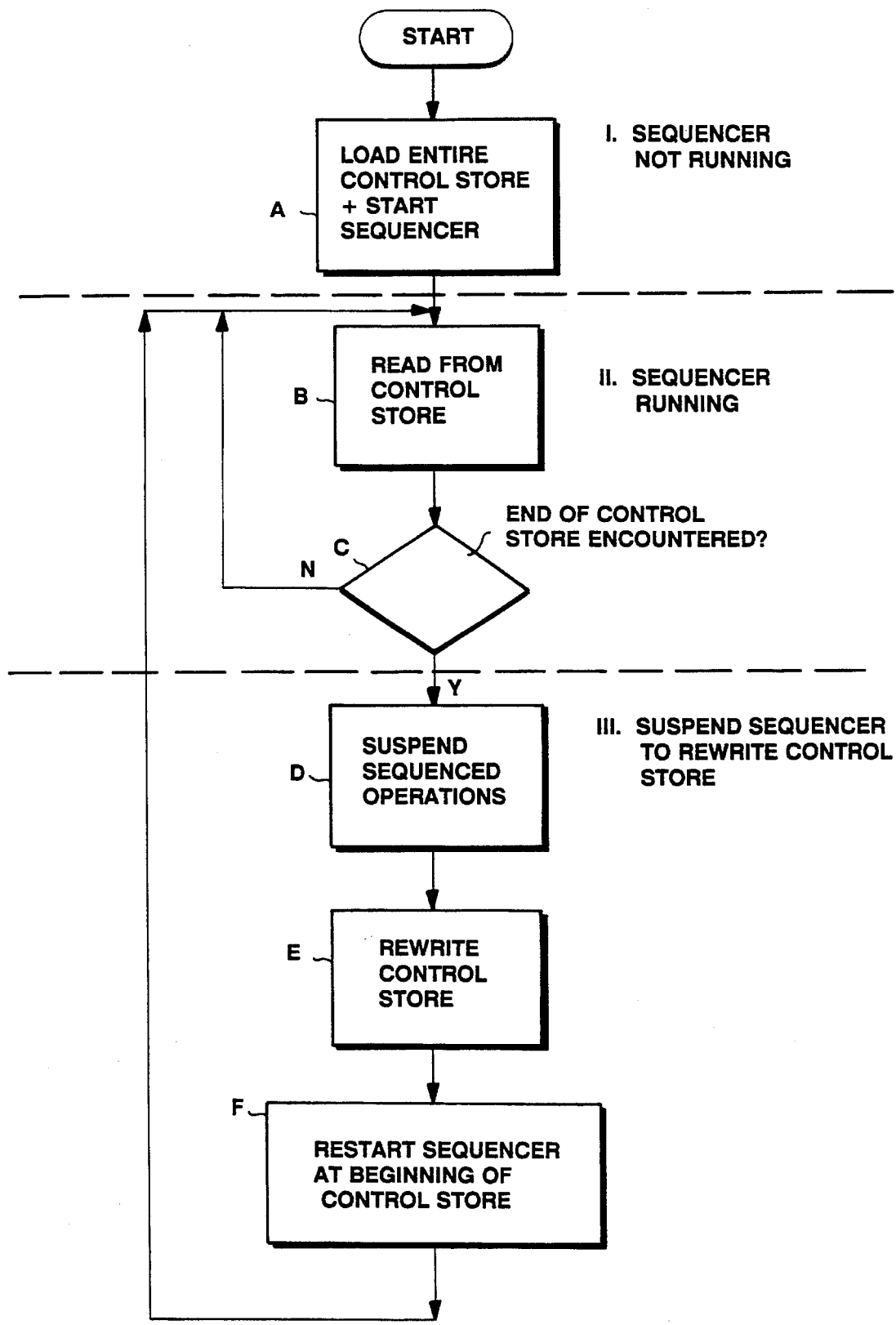

When the human operator requests system 100 to link and load the selected microcode routines, host processor 126 links the initial routine(s) and subroutine(s) with tables, etc. more or less in accordance with the program control steps of routines 604, 606 shown in prior art FIG. 1A–1C (with some differences, i.e., generating microcode page templates and an instruction offset table PCTTBL, as will be explained shortly)—continuing this linking process until a first page (16K micro-instructions long or less in the preferred embodiment) of linked microcode has been generated and stored in a Page 0 host memory buffer 232 within host computer memory 127 (FIG. 4, block 202). At this point Page 1 host memory buffer 234 contains a microcode template if more than one page of microcode is required for the sequence. Host processor 126 then sets a page indicator pointer (PI) to indicate sequencer control store Page 0 (for example) (block 204) and downloads this first page worth of microcode (including the associated subroutines, etc.) from memory buffer 232 into WCS 150 Page 0 using direct memory access (DMA) techniques (block 206; see FIG. 3A).

Figure 5A:
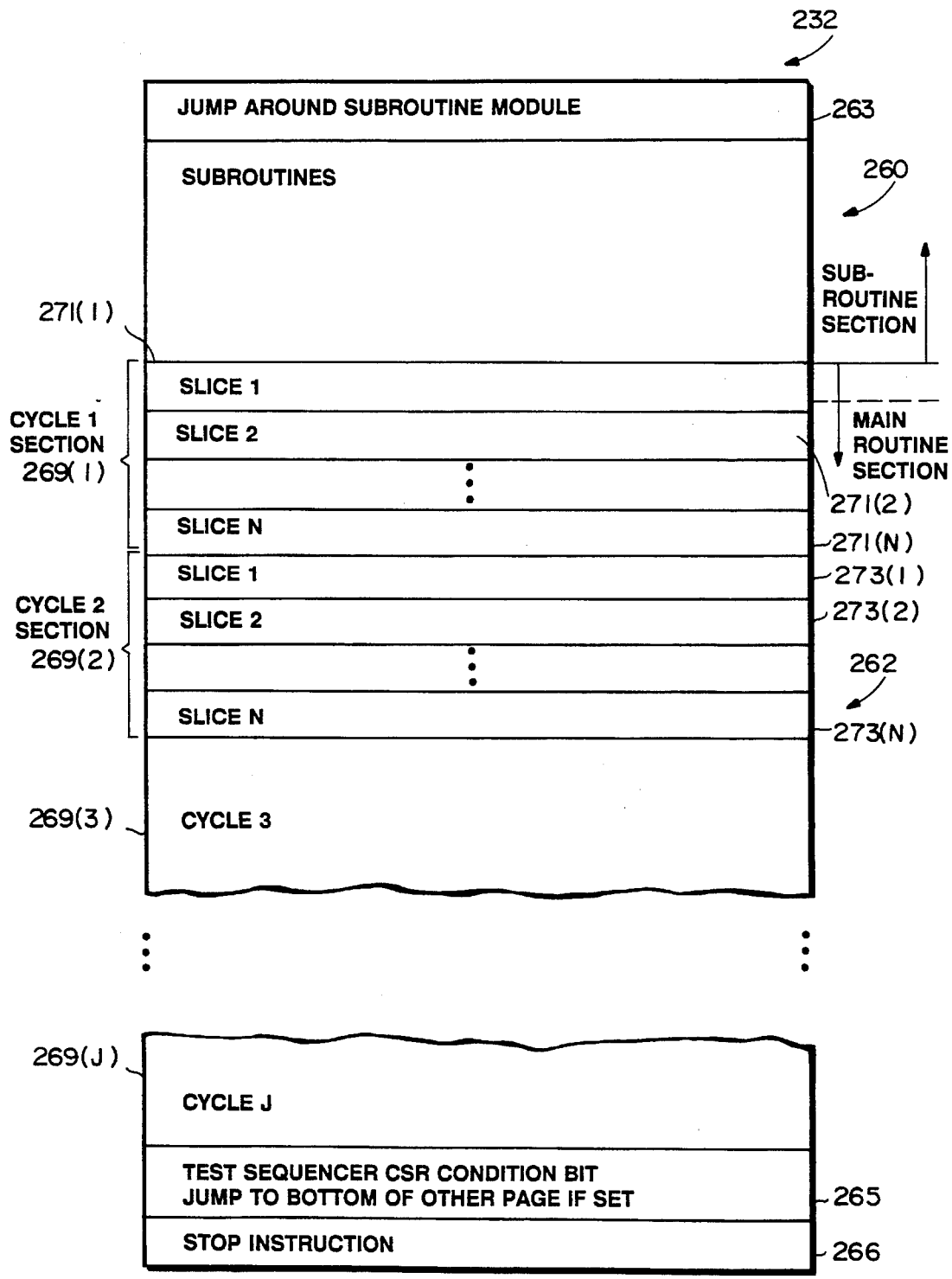
FIGS. 5A and 5B are schematic illustrations of the microcode contents of a memory template maintained by the preferred embodiment.
Figure 5B:
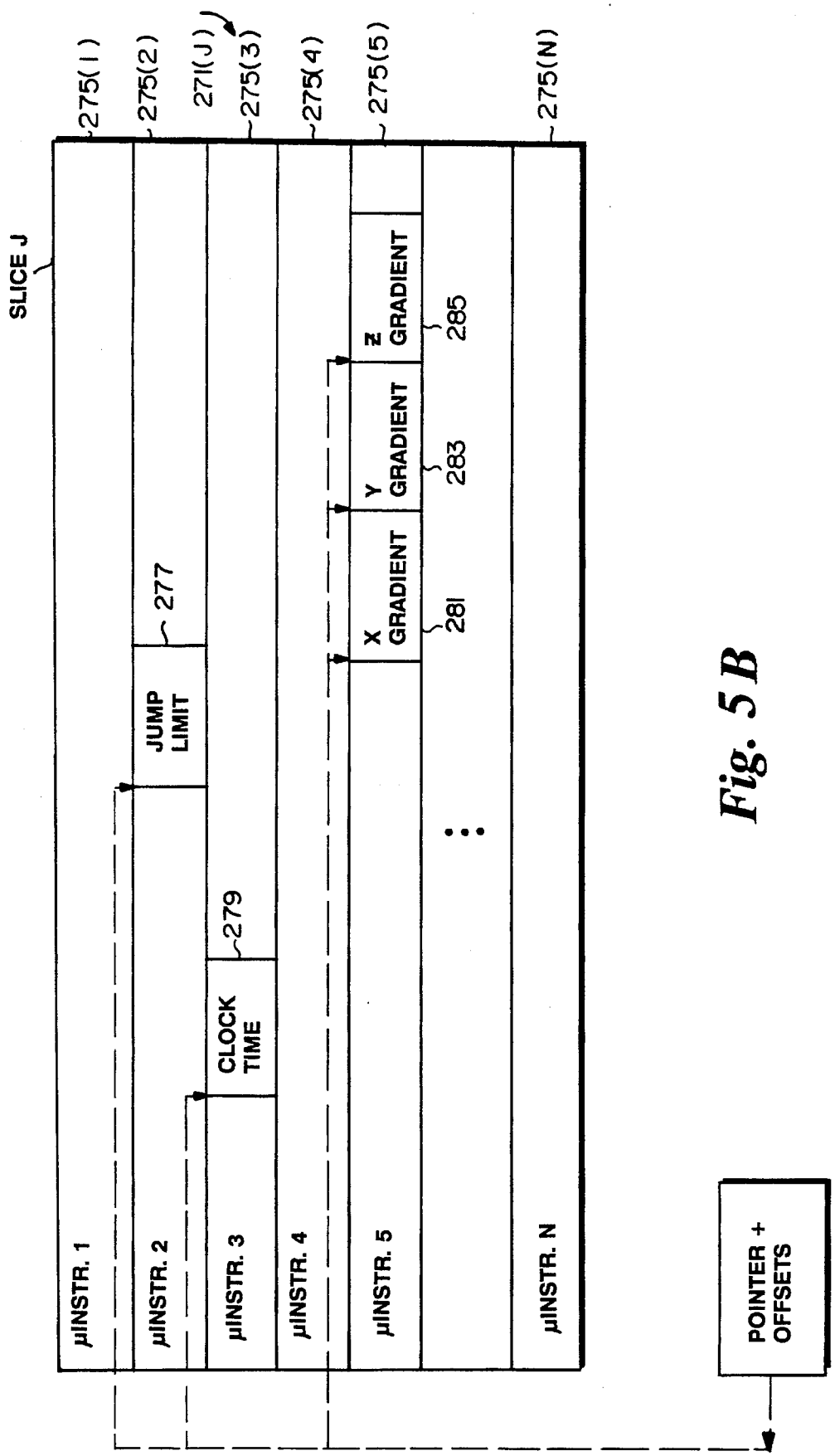

FIGS. 5A and 5B schematically illustrate exemplary contents of host memory buffer 232 at this point in time. FIG. 5A memory buffer contents include a subroutine section 260 and the main routine section 262. In the preferred embodiment, the subroutine section 260 is disposed at the very bottom of the page, and the main routine section occupies the remainder of the page. While FIG. 5A shows the subroutine section 260 to be smaller than the main routine section 262, it will be understood by those skilled in this art that the subroutine section 260 may in fact be much larger (in terms of number of microinstructions) than the main routine section 262 (e.g., the subroutine section may occupy 14K of instructions with the main routine section 262 occupying perhaps only 2K).

In the preferred embodiment, the very first microinstruction within (i.e., at the very bottom of) memory buffer 232 is an "unconditional jump" instruction typically having the effect of instructing sequencer 140 to jump "around" subroutine section 260 so as to execute, as the second instruction in the page, a first microinstruction within main routine section 262. By providing this first "jump" instruction (shown in FIG. 5A at 263) at the very bottom of the memory buffer 232, it is possible for the sequencer when changing pages to always begin executing at the first instruction within the new page (thus simplifying the software jump transfers between pages).

The next to last instruction 265 is either a STOP instruction; or an instruction that has the effect of allowing sequencer 140 to jump to the bottom of the other page of writable control store 150. In the preferred embodiment, a conditional branch instruction 265 causes the sequencer 140 to test the setting of a sequencer control status register condition bit. The sequencer control status register contains a bit indicating whether host processor 124 is currently writing to the other page. The effect of the instruction 265 is to prevent sequencer 140 from jumping to the page of writable control store 150 being written by host processor 124—and to stop the sequencer and generate an error if this ever occurs by continuing to STOP instruction 266.

Main routine section 262 as shown in FIG. 5A includes plural phase encoding "cycle" sections 269 (e.g., a first cycle may be defined by a section 269(1) of microcode, a second cycle may be defined by the section 269(2) of microcode, and so, with a Jth cycle being defined by a microcode section 269(J). Each cycle section 269 in turn includes plural slice sections 271. Each slice section 271 comprises one or more microinstructions (typically including calls to various subroutines within subroutine section 260) corresponding to a single electronic positioning of a slice-volume of object 10 to be imaged.

In conventional multi-slice MRI systems, multiple slices are typically imaged in rapid sequence (with the slice sequence being sufficiently long in duration to permit $T_1$ relaxation to occur before the same slice is excited again). A given cycle section 269 includes such a sequence of multiple slice sections 271(1)–271(N).

In the preferred embodiment, different cycle sections 269 correspond to different phase encodings to be collected. As is well known, phase encoding is typically used to encode spatial information in one or more (e.g., two) directions so as to obtain multi-dimensional (e.g., 2-D or 3-D) images. Phase encoding involves gradually changing one or more gradients during a scan to provide, for the same slice-volume, different gradient values in one or more directions.

In the preferred embodiment, all of slice sections 271(1)–271(N) within cycle section 269 (1) are encoded with the same phase encoding parameters—such that cycle section 269(1) includes microinstructions for each slice to be imaged and specifying the same phase encoding values. A further cycle section 269(2) of microcode includes slice sections 273(1)–273(N) corresponding to slice 271(1)–271(N), respectively; but the slice sections within cycle section 269 include different phase encoding values (specifying a different phase encoding from the one specified by the first cycle section 269(1)). In general, the principal differences between the microcode specified within cycle section 269(1) and the microcode within cycle section 269(2) is the different phase encoding values (i.e., X gradient value, Y gradient value and/or Z gradient value; excitation time duration values; etc.). Of course, there typically also are differences in the JUMP and BRANCH addresses specified in different cycle sections 269 due to the different areas of memory in which those cycle sections are stored.

FIG. 5B is a schematic illustration of an exemplary excerpt from one of slice sections 271 shown in FIG. 5A. Although a slice section from cycle section 269(1) is illustrated, the FIG. 5B diagram is generic to any slice section from any cycle section.

The illustrated slice section 271(J) includes microinstructions 275(1)–275(N), each of which may include various microinstruction fields (e.g., op code field, clock time field, system control fields, a wait field, etc.) as illustrated in FIG. 5B. Microinstruction 275(2) shown in FIG. 5B includes, for example, a "Jump Limit" microinstruction field 277. Microinstruction 275(3) includes a "clock time" microinstruction field 279. Microinstruction 275(5) shown in FIG. 5B includes an X gradient control field 281, a Y gradient control field 283, and a Z gradient control field 285. The "Jump Limit" field 277 in the preferred embodiment may specify, for example, a loop counter for controlling the number of times a particular cycle and/or slice section is executed. The clock time field 279 controls the duration of a particular state (e.g., so as to provide a different phase encoding value). X, Y and X gradient fields 281, 283, 285 may similarly electronically specify different phase encoding values. Microinstructions 275(1)–275(n) also have embedded within them various absolute and/or relative addresses (not shown) pointing to subroutine section 260 and/or to other microinstructions within main routine section 262.

Typically, there are a relatively large number of cycles (e.g., 256 or more) specified within a single NMR pulse sequence (the number of cycles in part determines the spatial resolution of the resulting image, and higher resolution images are generally more useful). In addition, it is common practice in MRI to repeat data acquisition for the same slice and phase encoding parameters and to provide data averaging in order to reduce noise. Thus, a typical MRI pulse sequence may involve executing particular cycle sections 269 (and/or particular slice sections 271) a plurality of times to permit data averaging or other noise reduction techniques.

Referring back to FIGS. 3A and 4, host processor 126 loads the micro-instructions into Page 0 sequentially in ascending address order in the preferred embodiment (with the subroutine segment of microcode being written into the bottom of the page)—with page indicator PI corresponding to the most significant bit (MSB) of the memory addresses applied by the host processor to the sequencer. See copending commonly-assigned application Ser. No. 07/571,258 filed; 23 Aug. 1990 entitled "Continually Loadable Microcode Store for MRI Control Sequencers" (Attorney Docket No. 89-108) now issued U.S. Pat. No. 5,144,242 for additional details regarding the mechanisms used in the preferred embodiment for loading sequencer 140.

As mentioned, in the preferred embodiment the last executable micro-instructions the host processor 126 loads into either page of sequencer WCS 150 are always either a branch, if CSR condition bit set, to the first executable micro-instruction within the other page, followed by a STOP micro-instruction; or a STOP micro-instruction. Thus, the conditional branch micro-instruction the host processor loads into WCS 150 Page 0 is a branch to an as yet uninitialized location within WCS Page 1 (and in general, such conditional branch page transfer micro-instructions will point initially to locations within the other page of WCS that do not contain proper target micro-instructions for the conditional branch at the time the page transfer micro-instruction is loaded). In the preferred embodiment, the host processor 126 is never allowed to write into the page of WCS 150 that is being read by sequencer 140. The assumption is made in the preferred embodiment that by the time the sequencer 140 executes the conditional branch micro-instruction, host processor 126 will have not only written the proper micro-instruction into the location that is the conditional branch micro-instruction target—but will actually have written the entirety of the other page of WCS 150. The host will also have set the sequencer CSR condition bit. Note that in the preferred embodiment, this page transfer conditional branch micro-instruction is typically the only page transfer micro-instruction stored within the page.

Once host processor 126 loads Page 0 of WCS 150, it toggles its page indicator PI to indicate Page 1 (FIG. 4, block 204) and then starts sequencer 140 (FIG. 4, block 208). Sequencer 140 begins executing micro-instructions from Page 0 of WCS 150, with WCS Page 1 still being empty at this point (see FIG. 3B).

Host processor 126 then determines whether there is further microcode to be executed by sequencer 140 that has not yet been loaded into WCS 150 this determination was also made before loading the last page of microcode—since if no more microcode is to be loaded, the last instruction in that page should be specified as a STOP instruction) (FIG. 4, decision block 210). If there is no more microcode, the host processor 126 is finished loading the sequencer 140 and can perform other functions and processes ("N" exit of decision block 210, FIG. 4). Typically, however, there will be additional microcode to load ("Y" exit of decision block 210, FIG. 4) and host processor 126 will proceed to link the next portion of microcode until a further page worth of microcode has been generated (FIG. 4, block 212).

Linking of this initial Page 1 is partially performed when linking Page 0 in the preferred embodiment by copying the subroutine section 260 and a single (e.g., the first) cycle section 269 from the Page 0 microcode (stored in the host's Page 0 memory buffer 232) into a Page 1 memory buffer 234 within host computer memory 127. By editing this copied subroutine data and replicating and editing the cycle section (as will be explained shortly) to alter addresses and slice-specific parameters a microcode template is created which allows linking to be completed very efficiently. An important observation regarding the regularity and redundancy of sequencer microcode is that, generally, all of the slice-dependent values for an entire MRI pulse sequence are contained within a single (e.g., the first) cycle section 269; and substantially the only differences from one cycle section to another involve different phase encoding values (and also different addresses reflecting different sequencer memory addresses in which the different cycle sections are stored). Thus, it is possible to generate any phase encoding cycle section 269 by simply deriving or replicating it from any other phase encoding cycle section (and by providing appropriate addresses and cycle-specific values within the replicated code). Linking is completed by simply editing the microcode template in memory buffer 234 to replace certain cycle-specific values.

In this way, host processor 126 in accordance with the preferred embodiment is capable of relatively rapidly generating microcode contents for its Page 1 memory buffer 234 for loading into sequencer writable control store Page 1. Since WCS 150 Page 1 is empty at this point and sequencer 140 is reading Page 0, host processor 126 immediately begins loading this generated linked microcode from the Page 1 memory buffer 234 into sequencer WCS Page 1 using DMA techniques (FIG. 4, block 214).

FIG. 3C depicts schematically the situation existing at this point in time—with sequencer 140 reading micro-instructions from Page 0 of this sequencer control store and host processor 126 writing micro-instructions to Page 1 of the sequencer control store. Sequencer 140 in the preferred embodiment time multiplexes access to WCS 150 so that the sequencer and host processor 126 never simultaneously access the WCS (and thus, common memory addressing and other circuitry can be used for both sequencer and host processor memory accesses). Even though sequencer 140 is perhaps two orders of magnitude faster than host processor 126, the time durations of normal NMR output states all but guarantee that host processor 126 will finish writing WCS 150 Page 1 before sequencer 140 finishes reading from WCS Page 0.

After host processor 126 finishes loading WCS Page 1, it toggles the page indicator (PI) to point to WSC Page 0 (block 214, FIG. 4) and then determines if there is still more microcode to load (decision block 210, FIG. 4). If there is, host processor 126 determines if the sequencer 140 is running in Page 0 (decision block 211, FIG. 4). If it is not, the next page of microcode is linked (block 212, FIG. 4) and loaded (block 214, FIG. 4)) (of if desired, linking and loading can be carried out simultaneously at block 214). Host processor 126 links this (and all subsequent) pages of microcode extremely efficiently by simply editing the contents of its memory buffers 232, 234 to replace certain parameters (e.g., cycle-specific values) with new values in order to produce linked microcode for reloading pages of the sequencer writable control store 150.

More particularly, the preferred embodiment uses a memory image of microcode previously loaded into a physical page of the sequencer 140 control store 150 as a "template" for generating microcode to be used to reload that sequencer control store physical page. Since the reloaded microcode occupies the same physical address space within the sequencer control store 150 as the previously loaded microcode (and due to the high degree of redundancy and similarity between the microcode to be reloaded and the subsequently loaded microcode), the same memory image used to provide the earlier loaded microcode can (with only minor editing) be used to reload the sequencer control store page.

In accordance with an important feature of one aspect of the present invention, only particular fields (e.g., fields 277, 279, 281, 283 and 285 as shown in FIG. 5B specifying jump limits, clock times, and X, Y and Z gradients) need to be edited from one page of microcode to the next.

By making all pages of microcode conform to the same structure and layout shown in FIG. 5, the preferred embodiment of the present invention dramatically simplifies the tasks involved in linking/generating subsequent pages of microcode. For example, assume the microcode initially loaded into Page 0 of sequencer writable control store 150 includes a particular subroutine section 260 and cycle sections 269(1)–269(J). It is possible to require every subsequent Page 0 of microcode to conform to precisely the same memory "template" or structure—and to include exactly the same subroutine section 260 and the same number (and placement in terms of memory addresses) of cycle sections 269 in such subsequent pages. In fact, it is possible to provide a one-to-one correspondence (on an instruction level) between an initial page memory image and subsequent page memory images—with corresponding instructions occupying corresponding memory addresses.

Assume that one provides subsequent page memory images having one-to-one correspondence, in terms of microinstructions and associated memory addresses, with a previous or initial page memory image (and assume identical subroutine sections 260 are included at identical addresses in both subsequent and initial memory images). Under such circumstances, all internal absolute and relative branch and jump addresses will be identical for the initial page and all subsequent pages.

In accordance with an important aspect of one feature of the present invention, the various conditions expressed above are met so that only phase encoding related parameters (which vary from one cycle to the next) need to be changed from one microcode page to the next. The preferred embodiment Linker provided by the present invention takes advantage of the high degree of resulting regularity in microcode images from one page to the next by avoiding the time-intensive processing of slavishly regenerating subsequent pages of microcode once an initial page of microcode has been generated. More particularly, the preferred embodiment Linker transforms a memory image of microcode that has previously been loaded into, for example, Page 0 of the sequencer writable control store 150 into a memory image to be used to reload sequencer WCS 150 Page 0 by merely selectively replacing such phase encoding value fields 277–285 with new values appropriate for a different corresponding phase encoding cycle (such phase encoding values used for replacement may be obtained from Program Change Tables of the type described in Hoenninger '661).

In accordance with another important aspect of the present invention, memory images corresponding to each of plural physical pages of the sequencer control store 150 are generated and then continually reused. For example, the sequencer 140 shown in FIG. 2 provides a writable control store 150 having two physical pages: Page 0 and Page 1. In the preferred embodiment, host computer 126 maintains, in memory buffer 232, the image or template corresponding to sequencer 140 physical Page 0 created at FIG. 4 block 202 (and later changed, perhaps successive times, at FIG. 4 block 212); and also maintains in memory buffer 234 an image or template corresponding to sequencer 140 physical page 1.

Because, in the preferred embodiment, the sequencer physical pages have different memory addresses, the microcode to be loaded into those pages similarly must specify different absolute (and possibly also relative) addresses (e.g., for "jumps", branches, and loops). Although such addresses differ from one page to the other (i.e., from Page 0 to Page 1), the preferred embodiment Fast Linker provides that the addresses do not differ for microcode reloaded into the same physical sequencer page. By always maintaining a microcode memory image or template corresponding to each physical sequencer control store page, it is possible to reuse all of the previously generated address information by loading the appropriate memory image into the sequencer physical page to be reloaded. By reusing most of a previously generated sequencer microcode memory image (thus eliminating the need to calculate or generate new address information each time a sequencer control store 150 page needs to be reloaded, and even eliminating the need to replicate code), the preferred embodiment Fast Linker can run much faster and execute far fewer steps than what might be possible if a less complete (e.g., single cycle) template were to be used as the basis for generating the next page worth of microcode.

Host processor 126 does not attempt to access WCS 150 Page 0 until sequencer 140 indicates (e.g., by changing a status bit) that it has finished with Page 0 and is now reading from Page 1. Host processor 126 examines a sequencer status bit periodically and performs other functions, e.g., data acquisition and display with linking running as a non "time critical" process (block 213, FIG. 4) while waiting for sequencer 140 to finish executing the current page. Due to the extremely rapid and efficient nature of the linking process of block 218, host processor 126 will typically be finished editing the contents of Page 0 memory buffer 232 long before sequencer 140 has finished executing the microcode within its WCS Page 0.

When sequencer 140 reaches the end of the microcode routines loaded within WCS 150 Page 0, it executes the JUMP microinstruction 265 (mentioned earlier) to the first executable micro-instruction 263 stored within WCS Page 1. When the host reads the sequencer command and status register (CSR) and the CSR indicates that the sequencer has moved on to WCS 150 Page 1 (as tested for by decision block 211, FIG. 4), host processor 126 links and loads microcode from its Page 0 memory buffer 232 into WCS 150 Page 0 (FIG. 4, block 214). This situation is depicted in FIG. 3D—which shows host processor 126 writing to WCS 150 Page 0 while sequencer 140 reads from WCS Page 1.

Once host processor 126 finishes writing to Page 0, it toggles PI again (FIG. 4 block 214), determines if there is more microcode to load (FIG. 4 decision block 210) and repeats blocks 211, 212, 213 and 214 (i.e., by simply repetitively editing the contents of memory buffers 232, 234 in place as many times as necessary, each time replacing all cycle-specific values with new values) until there is no more microcode to link and load. The sequence of WCS 150 events thus alternate between FIG. 3C and FIG. 3D as many times as is necessary to load and run all of the microcode for the selected NMR sequence.

When host processor 126 finally determines in block 212 that there is no more microcode to link, it overwrites the next microinstruction in the memory buffer 232, 234 it is currently editing with a STOP instruction. When host processor 126 loads the contents of this memory buffer into sequencer writable control store 150, the host processor only loads the buffer up to the STOP instruction and then stops loading. This STOP instruction in the preferred embodiment acts as a halt instruction to the sequencer 140.

Because host processor 126 and sequencer 140 provide for continual linking and loading of WCS 150 while sequencer 140 is running, the user/programmer may view WCS 150 as an ideal virtual control store having an unlimited size. Programmers may write NMR microcode sequences without concern for whether they will "fit" into the physical memory space provided by WCS 150. Reloading of WCS 150 is completely transparent to ongoing NMR pulse sequences and causes no troublesome interruption of such sequences, and microcode is linked and loaded "on the fly" using a multitasking processor used simultaneously for data acquisition, reconstruction and display functions without placing undue demands on the processor's resources (and without increasing the time between user input of a "link and load" command and the time the sequencer 140 starts running).

III. More Detailed Description of Fast Linker Exemplary Program Control Steps Referring first briefly to FIG. 4, it can be seen that two different "link microcode" blocks are shown: "link Page 0 of microcode" block 202 and "link next page of microcode" block 212. In the preferred embodiment, block 202 links the initial Page 0 of microcode and creates the Page 1 microcode template and block 212 links all subsequent pages of microcode. Great efficiency and speed advantages are provided by the present invention chiefly through reuse by block 212 of the microcode provided by block 202—although the same basic "editing in place" steps are performed in the preferred embodiment for "link and load" steps 202 and 212. Additional details concerning exemplary program control steps and data structures provided in the preferred embodiment Fast Linker in accordance with the present invention will now be discussed in conjunction with FIGS. 6A–6F and 7A–7C.

Figure 6A:
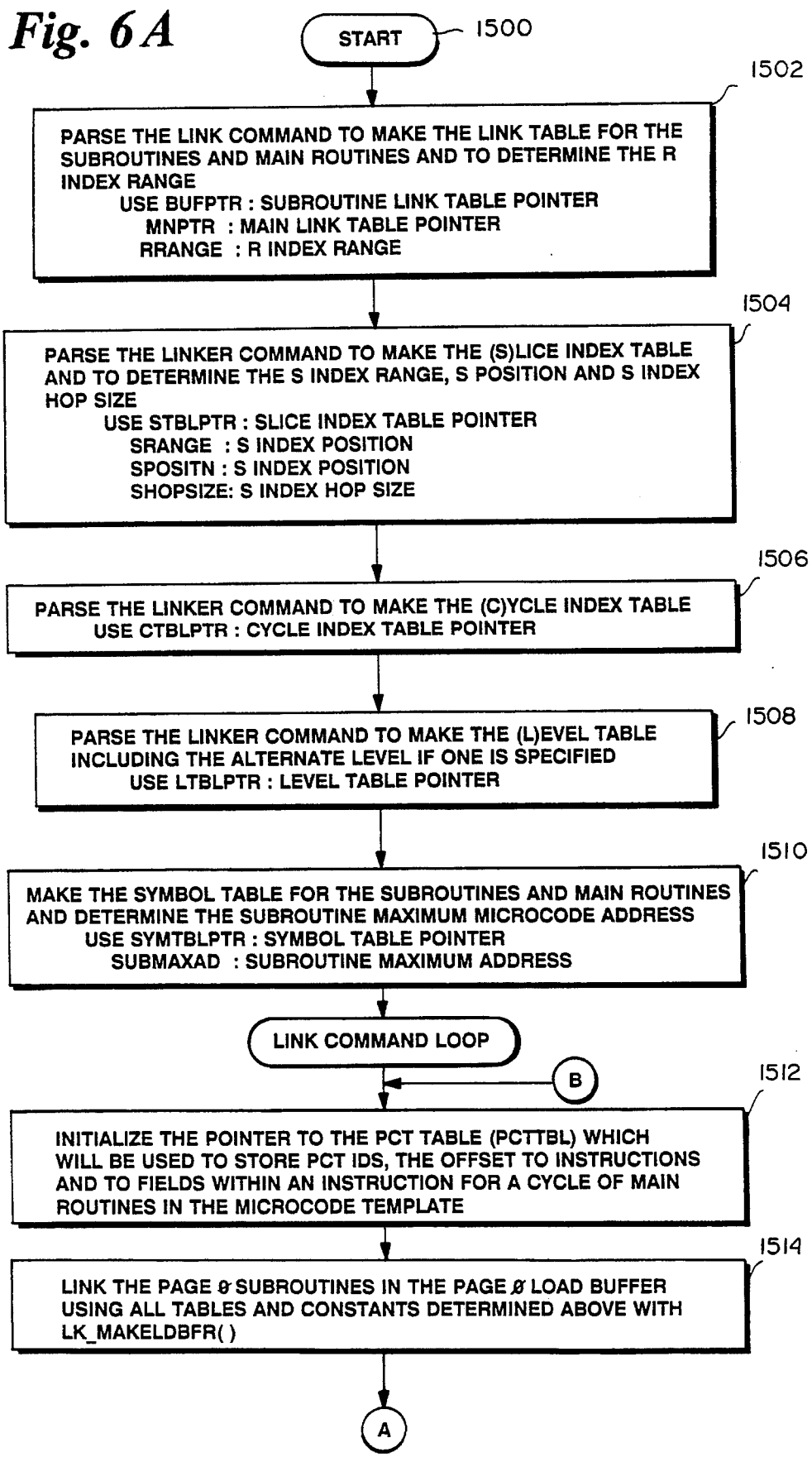
FIGS. 6A, 6B, 6C, 6D, 6E, and 6F are more detailed flowcharts of program control steps performed by the host processor shown in FIG. 2.
Figure 6B:
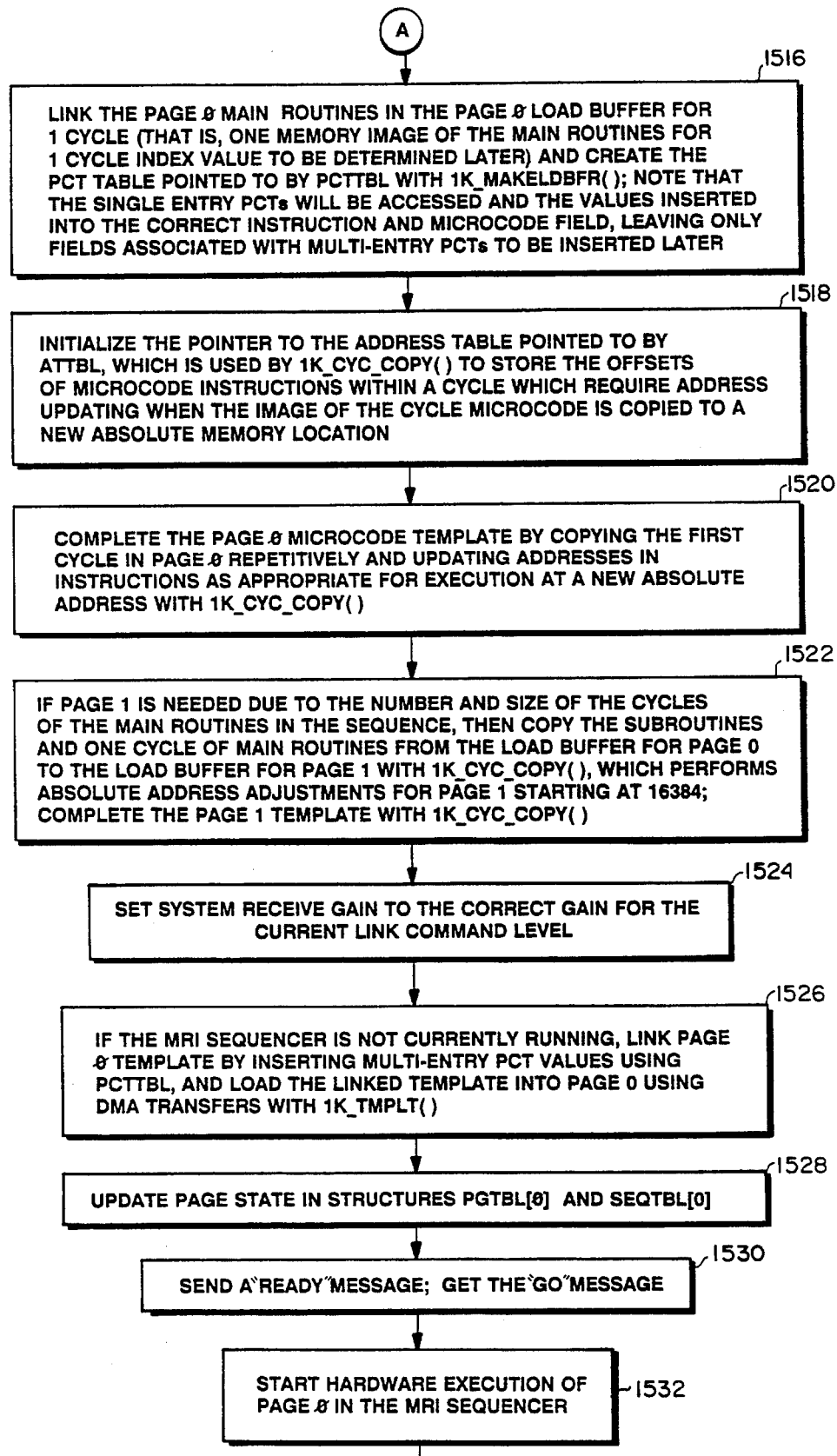
Figure 6C:
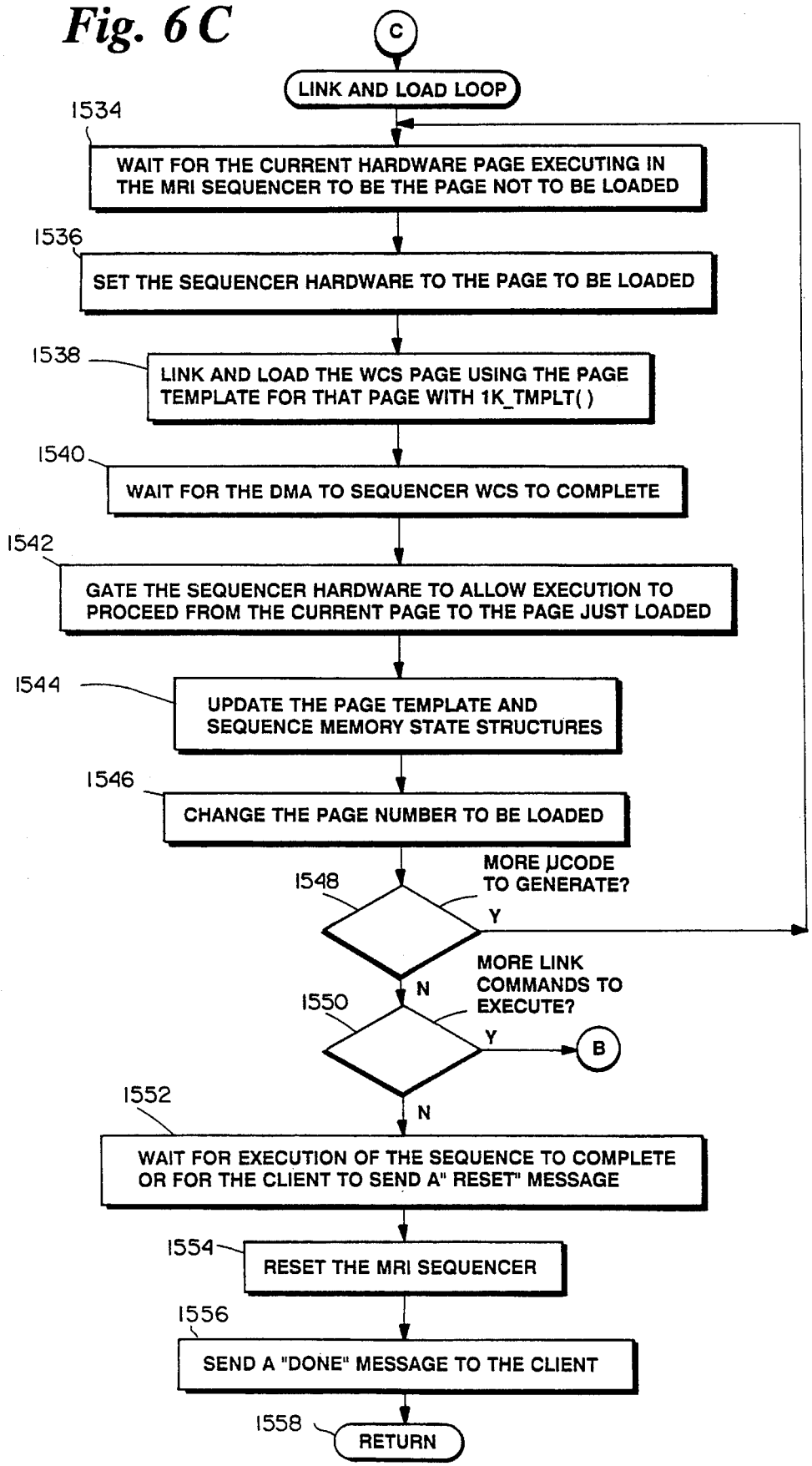

Referring now to FIG. 6A, "start" block 1500 is called by host processor 126 in the preferred embodiment to execute the Linker object (hereafter "Fast Linker") of a program called MRIMON (a detached control program hosted under the VMS operating system). The MRIMON program controls all hardware needed to generate data for acquisition and processing by the host processor 126. MRIMON communicates as a server with client processes on host processor 126 through VMS mailboxes to perform system control functions (such functions in the preferred embodiment including setting system hardware parameters, maintaining control sequence data bases, linking microcode from the system control database and loading it into the sequencer 140 for execution, loading waveforms for RF modulation into a digital random waveform generator, and performing runtime diagnostics on the hardware).

The Fast Linker provided by the preferred embodiment begins by parsing a user-inputted link command ("Link Control Statement") to make the link table for the subroutines and the main routines and to determine the r index range (block 1502). The Fast Linker further parses the linker command to make the slice index table and to determine the s index range, s position and s index hop size (block 1504). The Fast Linker then parses the linker command to make the cycle index table (block 1506), and to make the level table (including an alternate level if one is specified, block 1508).

The Fast Linker also makes the symbol table for the subroutines and the main routines, and determines the subroutine maximum microcode address (block 1510). The Fast Linker then begins executing an outer link command loop (which in the preferred embodiment includes support for "alternate levels", e.g., to permit collection of data for tracking the magnetic field so as to correct for magnetic field inhomogeneities) at block 1512.

Figure 7A:
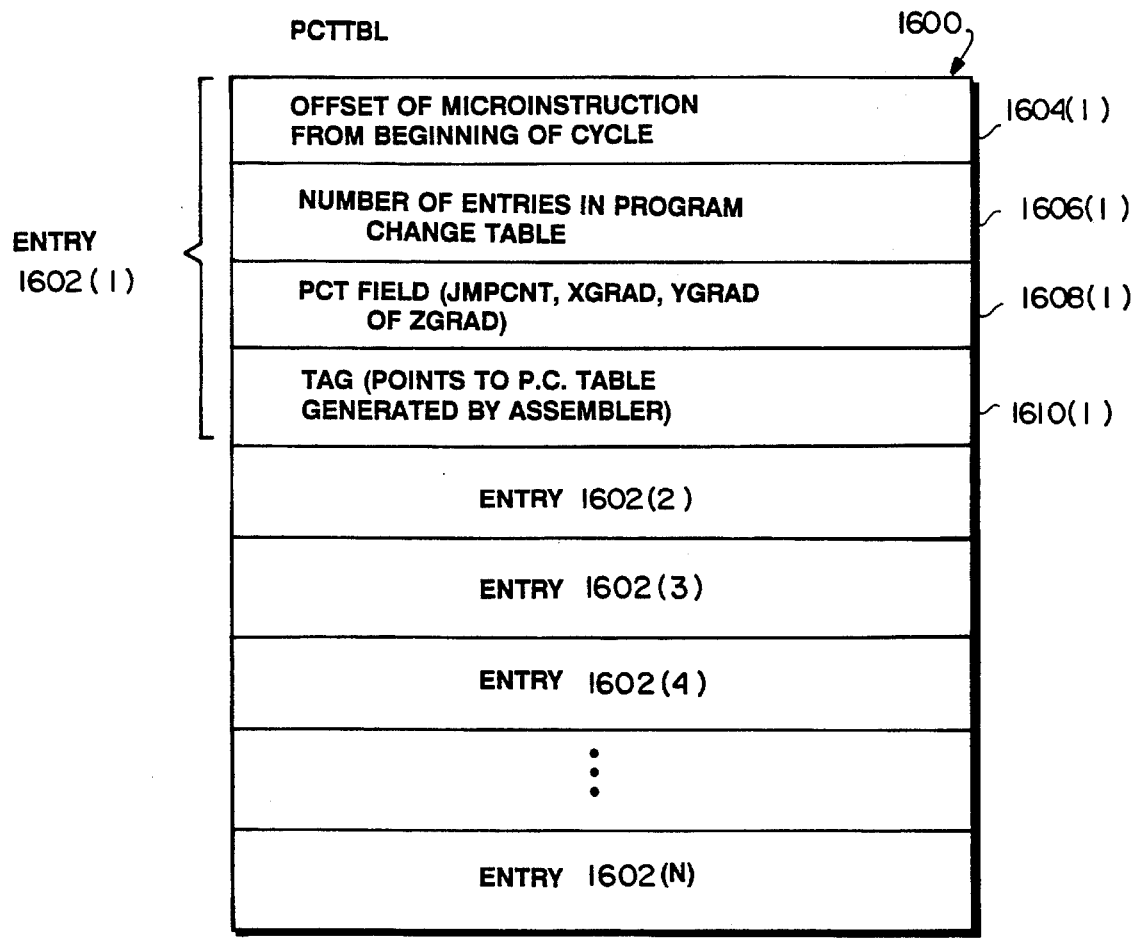
FIGS. 7A, 7B, and 7C are schematic diagrams of exemplary data structures used by the FIG. 2 host processor.

Within this outer link command loop, the Fast Linker first initializes a pointer (called "pcttbl") to a PCT table data structure used to store (a) PCT identifications, and (b) offsets to instructions and to fields within an instruction for a cycle of main routines in the microcode template (block 1512). FIG. 7A is a graphical illustration of an exemplary format for such a PCT table data structure 1600. This table includes multiple entries 1602(1)–1602(n), each entry including an "offset" record 1604 (specifying an offset from a particular microinstruction to be edited from the beginning of the cycle section 269); a "nument" record 1606 (which specifies the number of entries in an associated PCT); a "pctfld" record 1608 (specifying a type of PCT entry); and a "tag" record 1610 (this tag record points to a particular program change table generated by the microcode assembler from which a cycle-specific and/or slice-specific value is to be obtained). This PCTTBL data structure 1600 thus provides a linkage between (a) each multi-entry and cycle-specific value within each of the PCTs and (b) individual instruction fields within the memory image templates contained within memory buffers 232, 234. Moreover, in the preferred embodiment there is an entry 1602 within PCTTBL data structure 1600 corresponding to each microinstruction field within a (every) cycle section 269 that is to receive a multi-entry PCT value. Because the templates within the Page 0 and Page 1 memory buffers 232, 234 are essential identical (except for embedded addresses) to one another in the preferred embodiment, a single PCTTBL data structure 1600 can be used for both templates in the preferred embodiment.

Next, the preferred embodiment Fast Linker links the Page 0 subroutines in the Page 0 load buffer 232 using all tables and constants determined in steps 1502–1512 (block 1514). In the preferred embodiment, the subroutines are loaded first at microcode address 0, with the first subroutine always being PSEG1. The Fast Linker similarly links the Page 0 main routines in the Page 0 load buffer for a single cycle (i.e., one memory image of the main routines for one cycle index value to be determined later), this cycle data being loaded for the specified set of cycles at the appropriate levels. (In the preferred embodiment, a single Link Control Statement can specify the equivalent of separate link commands for alternate and primary levels, with the alternate levels occurring once at the beginning and once at the end of the primary level, e.g., to conveniently permit magnetic field tracking). The Fast Linker also creates the PCT table data structure 1600 shown in FIG. 7A at this time (block 1516). Note that the single entry PCTs are also accessed and values inserted into the correct instruction and microcode fields at this time—leaving only fields associated with multi-entry PCTs (e.g., values and parameters which depend on phase encoding selection) to be inserted later.

The preferred embodiment fast linker then initializes a pointer to an address table pointed to by a pointer called "attbl" (block 1518). This address table is used to store the offsets of microcode instructions within a cycle which require address updating when the image of the cycle microcode is copied to a new absolute memory location (and is used to build the PCTTBL data structure 1600). In addition, page template control block data structures 1650

Figure 7B:
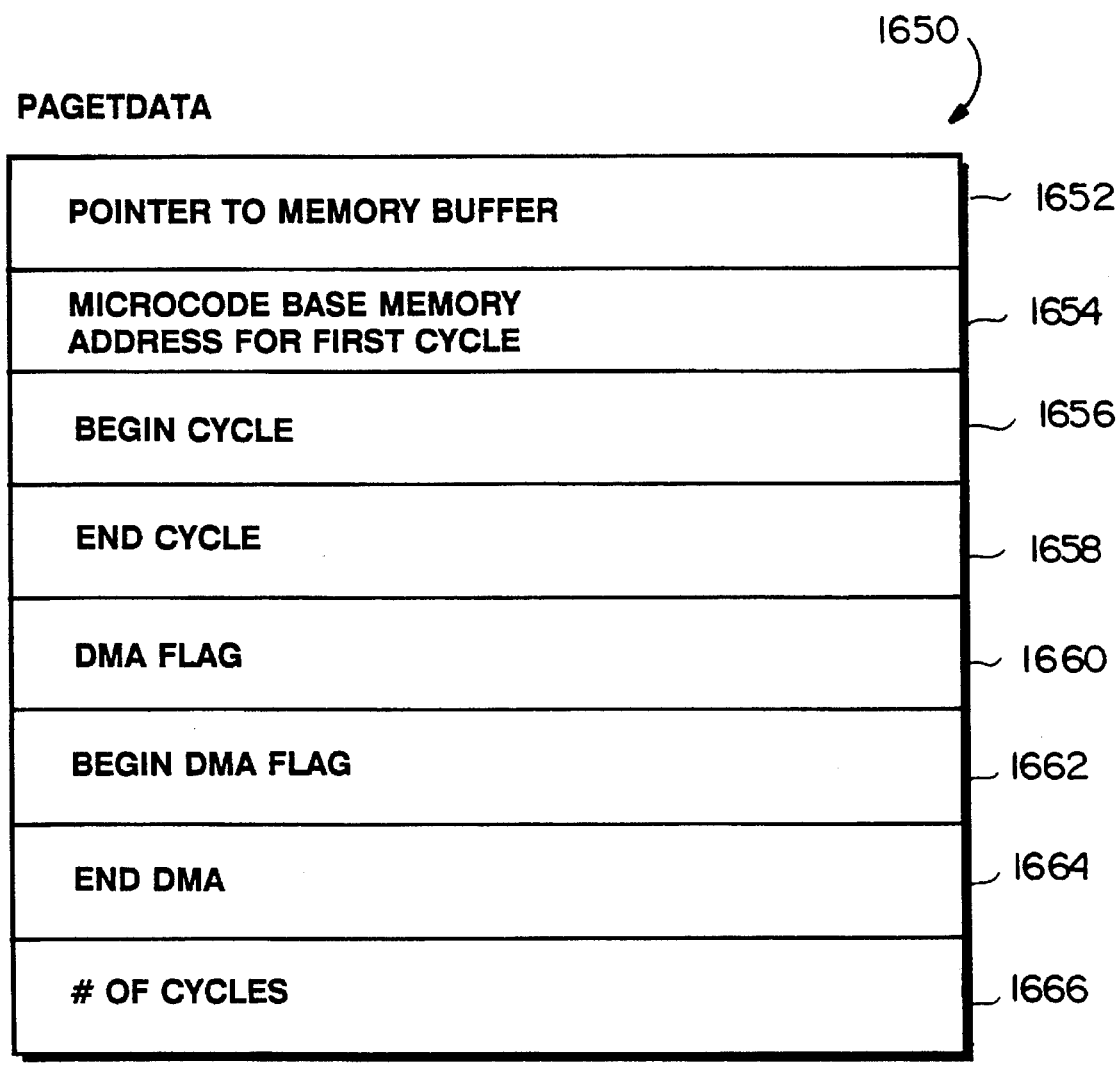
Figure 7C:
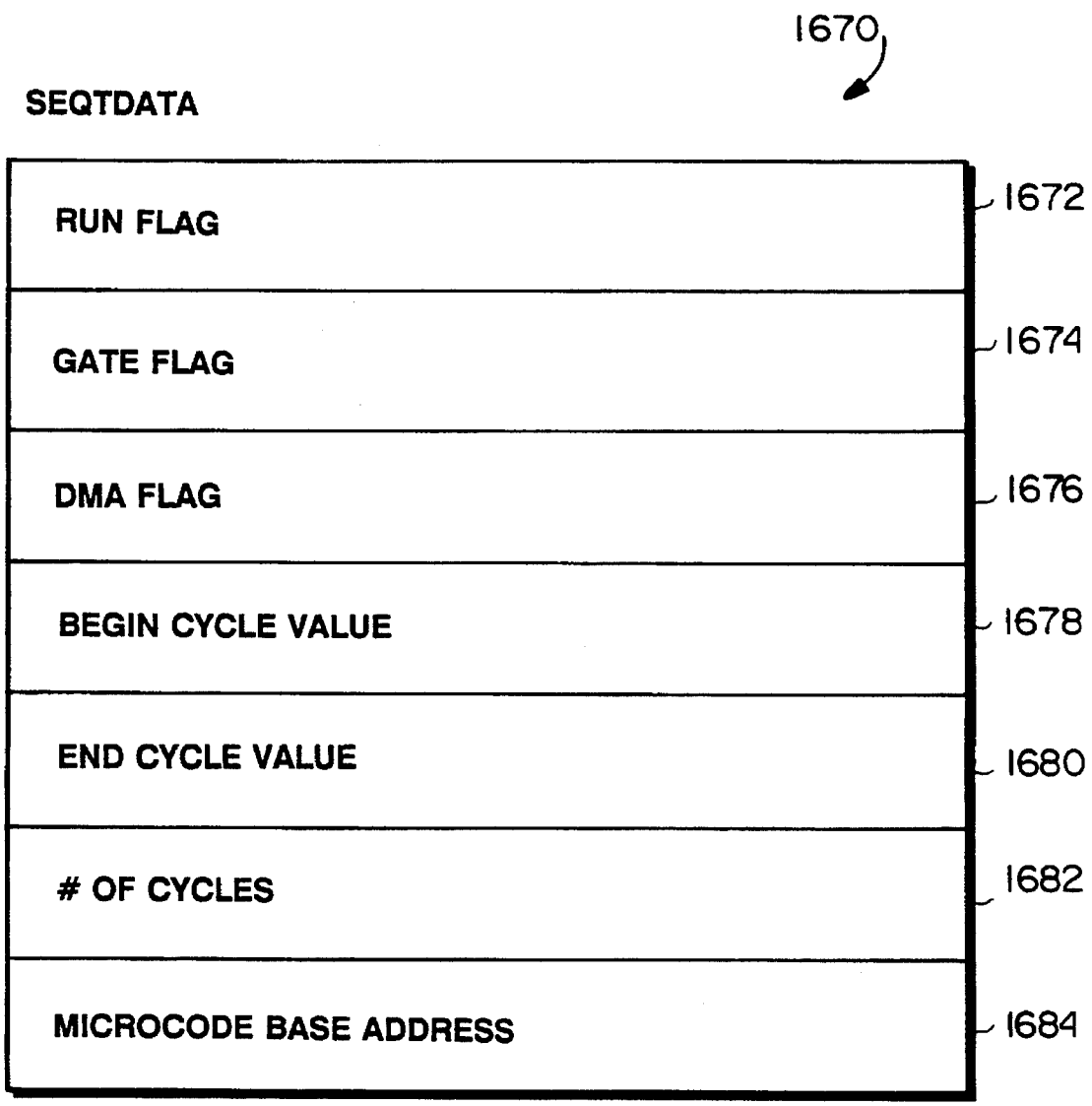

(one for each of Page 0 memory buffer 232 and Page 1 memory buffer 234, see FIG. 7B) are set up to keep track of microcode base addresses (record 1654), number of (and which) cycles the buffer contains (records 1656, 1658, 1666), and DMA status (records 1660, 1662, 1664).

The memory image of the initial Page 0 of microcode within Page 0 memory buffer 232 is then completed by copying (replicating) the first cycle in Page 0 repetitively and updating addresses in instructions as appropriate for execution at a new absolute address (block 1520). At this point in time, the Page 0 memory buffer 232 still does not contain loadable microcode in the preferred embodiment—since multi-entry PCT values have yet to be inserted. Rather, the Page 0 memory buffer 232 contains a "template" that can be efficiently linked through editing to provide loadable microcode—as will be described shortly.

If the number and size of the main routines in the sequence require further microcode to be generated, the Page 1 memory buffer 234 is also loaded with microcode. To create a microcode memory image within Page 1 memory buffer 234, the subroutine section 260 and a single cycle section (e.g., 269(1)) of microcode are copied from the Page 0 memory buffer 232 into the Page 1 memory buffer. (block 1522). All absolute addresses specified within the Page 1 memory buffer 234 are adjusted during this copying process to conform with the different physical location of Page 1 within sequencer writable control store 150. In the preferred embodiment, Page 1 begins at WCS 150 absolute address (location) 16384 instead of address (location) 0—and the absolute addresses within Page 1 memory buffer 234 are adjusted accordingly (block 1522). The Page 1 memory buffer 234 is then enumerated by replicating the single cycle, inserting new addresses and single-entry PCT values as before to complete the microcode template.

If the sequencer 140 is currently running (i.e., if it is executing microcode produced as the result of an earlier link and load command), the host processor 126 waits for the sequencer to finish (e.g., by periodically checking a control status register within the sequencer to determine when the sequencer finishes and/or resetting the sequencer if a hardware error is detected). When the sequencer has (is) stopped, the preferred embodiment Fast Linker if necessary (e.g., due to the use of alternate levels) sets the system receive gain to the correct gain for the current link command level (block 1524). The Fast Linker then efficiently and rapidly links the Page 0 template stored in Page 0 memory buffer 232 to produce an initial "Page 0" of microcode and loads the linked microcode from the memory buffer 232 into Page 0 of sequencer writable control store 150 using DMA transfers (block 1526).

To perform the "link and load" task of block 1526, host processor 126 calls a function named "lk_tmplt()". This function "lk_tmplt" links the Page 0 microcode template stored in memory buffer 232 (by editing the memory image template contained within the memory buffer to insert phase encoding and multi-entry PCT values from the program change tables created by blocks 1504–1508 using the PCTTBL data structure 1600 shown in FIG. 7A). This same function is also responsible for actually loading the microcode from the host memory buffer into the sequencer WCS 150. A more detailed schematic flowchart of this "lk-tmplt" function is set forth in FIG. 6D–6F.

The "lk_tmplt" function has a number of parameters, including the following:

a pointer to the appropriate page template data table 1650 shown in FIG. 7B;

the current cycle being linked;

an indication of the cycle address span (i.e., the length of each cycle section 269);

the total number of cycles, including spin conditioning cycles, in the current sequence;

the number of spin conditioning cycles;

a pointer to a cycle table;

an indication of the number of cycles already linked;

a pointer to the PCT table data structure 1600 shown in FIG. 7A;

the current page number;

a pointer to a sequencer page table data block 1670 (shown in FIG. 7C) indicating the status of sequencer 140; and a hardware flag.

Figure 6D:
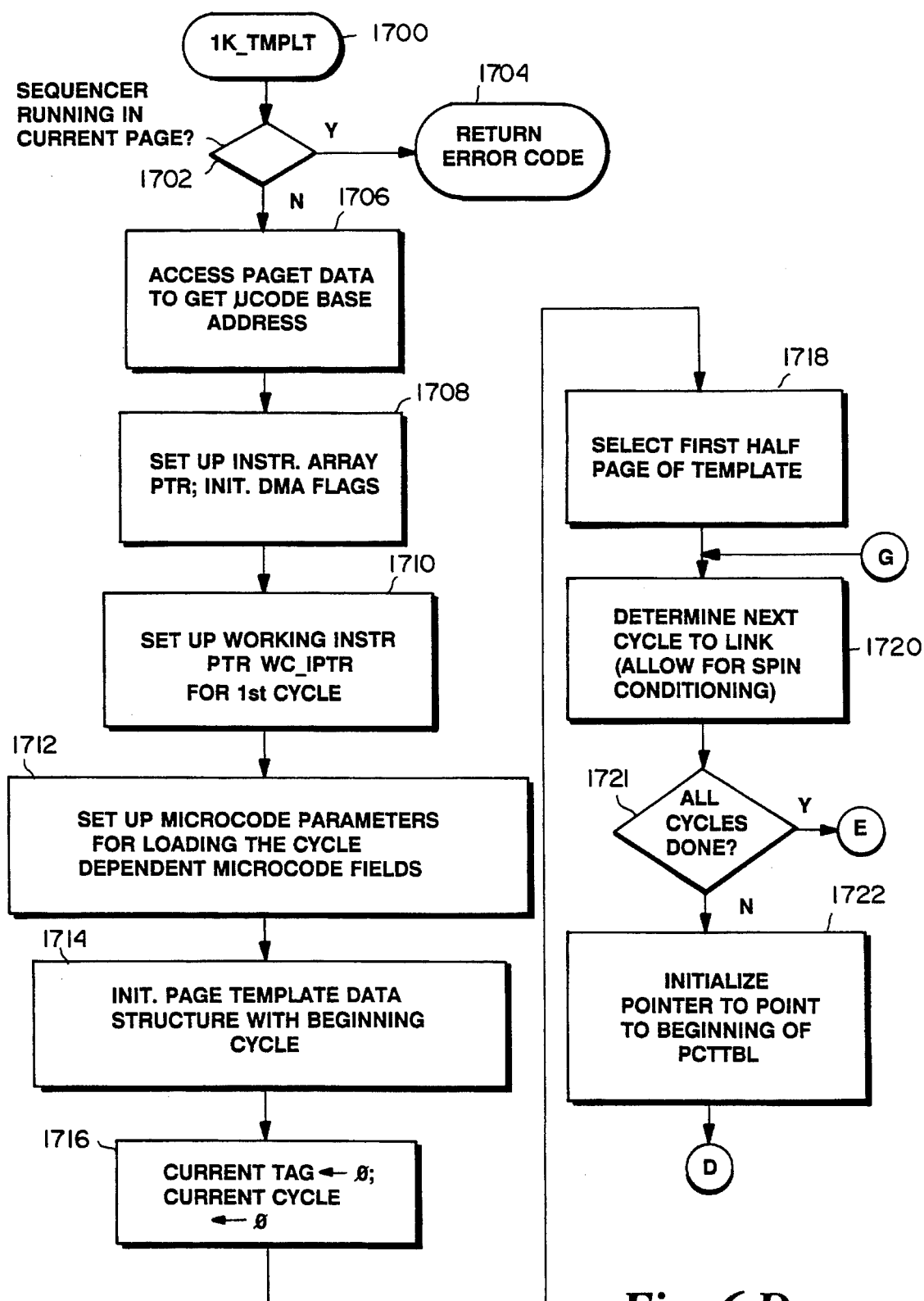
Figure 6E:
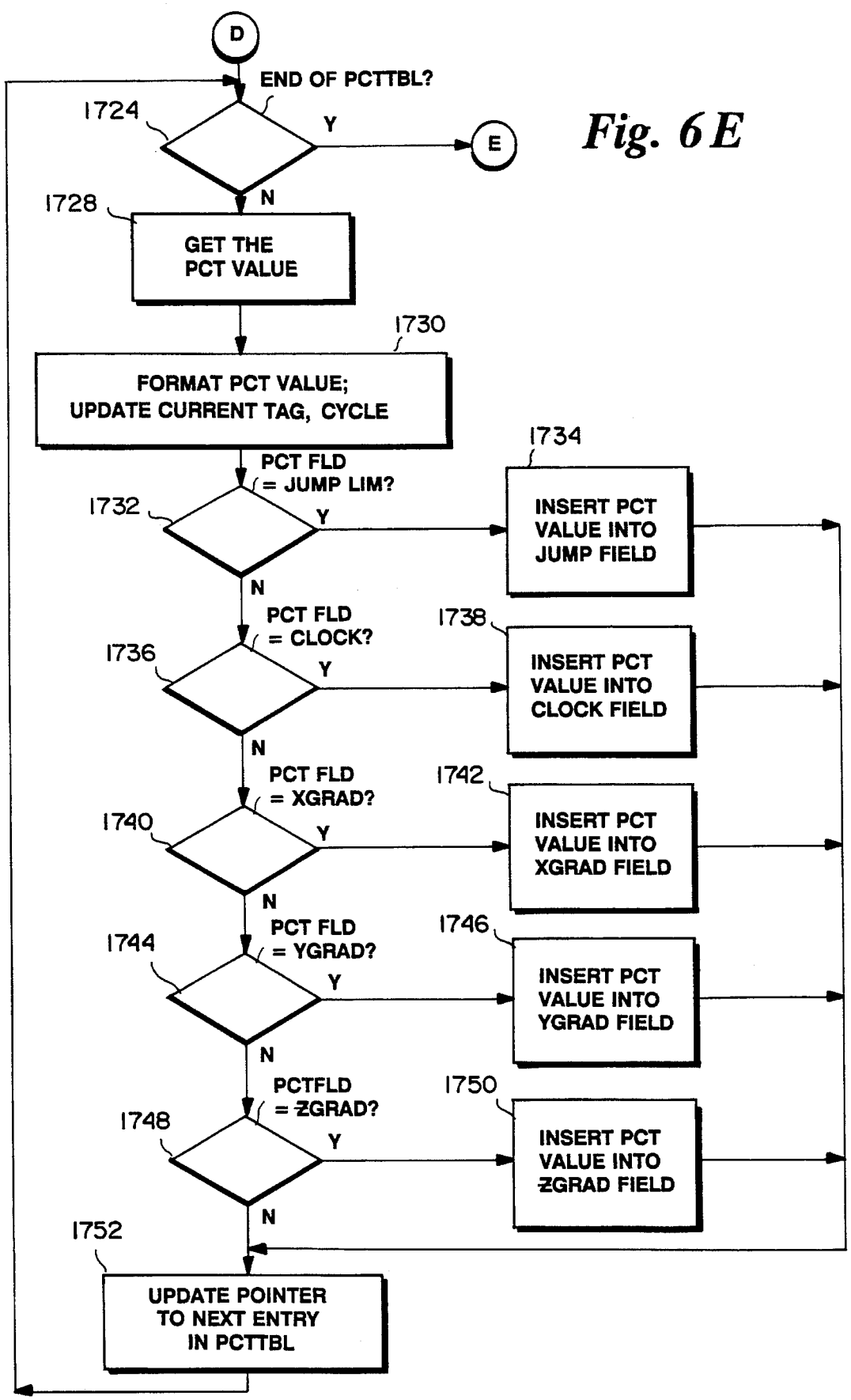
Figure 6F:
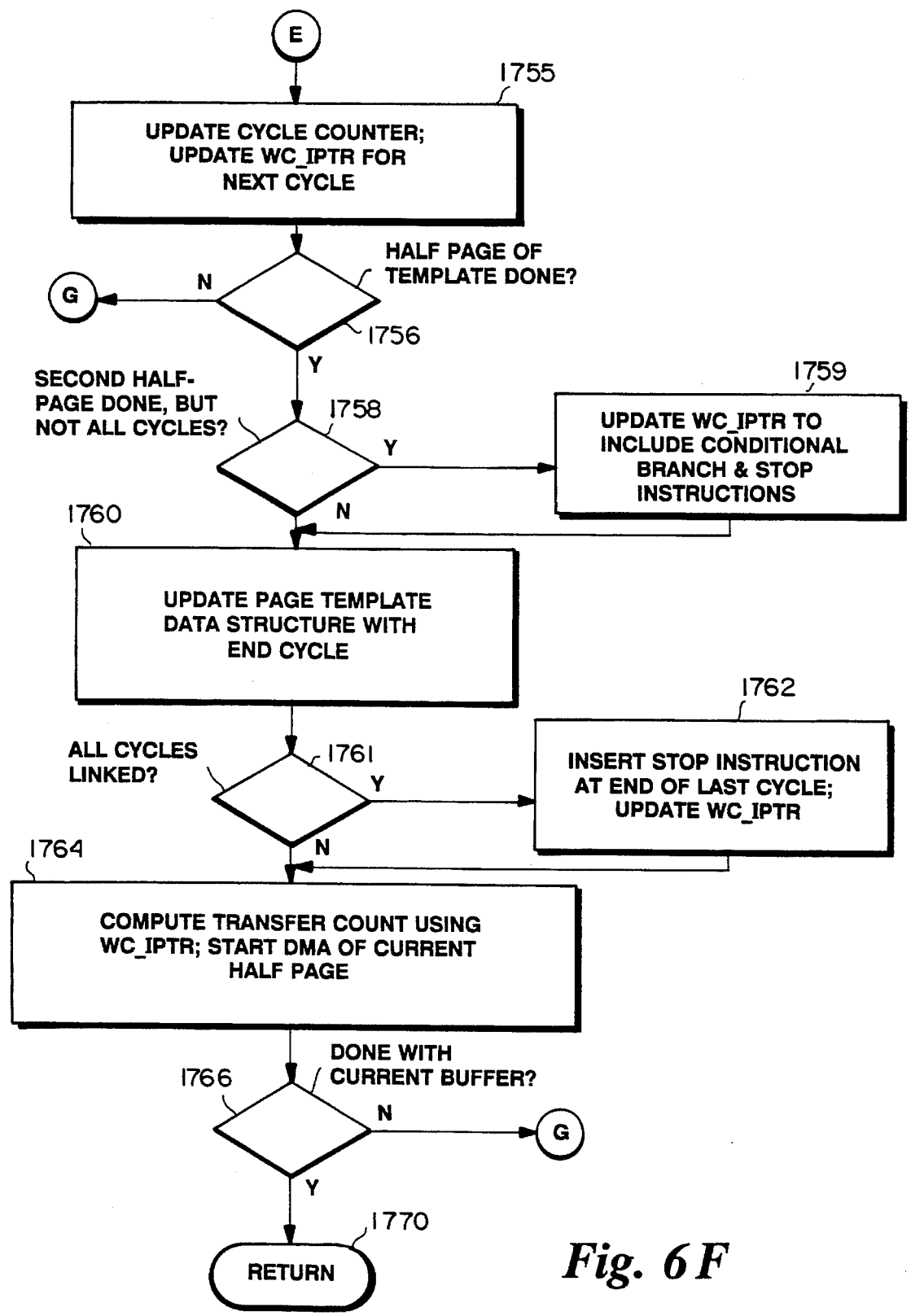

Referring now to FIG. 6D, the preferred embodiment Fast Linker first checks to make sure sequencer 140 is not executing microinstructions from the current page (block 1702); if the sequencer is running out of the current page, the function returns with an error code (block 1704). Assuming this error condition does not arise, the Fast Linker accesses the page template data structure 1650 to get the base address in the current memory buffer (232, 234) for the first cycle (block 1706). Variables and pointers within the page template data structure 1650 (e.g., a DMA pointer) are initialized at this time, and an instruction array pointer is initialized in response to the memory buffer pointer record 1652 of the page template data structure 1650 (block 1708). A further, working instruction pointer ("wc_iptr") is initialized in response to the instruction array pointer and the first cycle base address (block 1710). This working pointer is used to address microinstructions of the current cycle within the current page memory buffer (232, 234). Microcode parameters are then set up beforehand for loading cycle dependent microcode fields (block 1712). To complete initialization tasks, the beginning cycle is stored in record 1656 of the page template data structure 1650 (block 1714), and a "current tag" and "current cycle" counter are each initialized to 0 (block 1716).

At this point, the Fast Linker is ready to insert multi-entry PCT values into the instructions and fields listed in PCTTBL 1600 for all cycles in the cycle table or until the memory buffer (232, 234) has been completely edited. In the preferred embodiment, two separate DMAs (one for each half page) are used to provide concurrent linking and DMA loading of the sequencer 140.

The Fast Linker (at block 1718) divides the memory buffer into two half pages and selects the first half page (block 1718). The preferred embodiment Fast Linker then determines which cycle to do next (taking spin conditioning into account) by getting a "next" value from a formatted cycle table (i.e., a C value stored by block 1506) (block 1720). The Fast Linker determines if the end of the table has been reached, and branches to block 1755 if there are no more cycles to be done (block 1721). To actually update the multi-entry PCT values, the Fast Linker determines by referring to the PCTTBL data structure 1600 if (and where) the PCT value should be inserted. The Fast Linker first initializes a working pointer to point to the first entry of the PCTTBL data structure 1600 (block 1722). Assuming the end of the PCTTBL data structure 1600 has not been reached (decision block 1724), the Fast Linker gets the PCT value using data from the PCTTBL entry. Thus, in the preferred embodiment, the PCTTBL TAG record 1610 provides a linkage to a particular program change table; and as will be explained shortly, the PCT Field record 1608 provides a linkage to a specific microinstruction field to be written over-with the retrieved PCT value.

The retrieved PCT value is copied into a working variable (reformatting it in the process to provide for uniform insertion regardless of the length of the value retrieved from the PCT by block 1728), and the current tag and current cycle values are updated (block 1730).

The "PCT Field" record 1608 within the current PCTTBL entry 1602 is then tested to determine what type of microinstruction field is to be edited. In the preferred embodiment, the "lk_tmplt" function edits five different types of fields:

Jump Limit fields;

Clock fields;

X Gradient fields;

Y Gradient fields; and

Z Gradient fields.

The PCT field record 1608 indicates to the "lk_tmplt" function which of these microinstruction fields are to be edited. Decision blocks 1732, 1736, 1740, 1744 and 1748 test this PCT field record 1608, and blocks 1734, 1738, 1742, 1746 and 1750 insert the retrieved PCT value into the appropriate position within an appropriate microinstruction within the current cycle. Such insertion is performed in the preferred embodiment by indexing into the memory buffer (232, 234). Such an insertion address is obtained in the preferred embodiment by using the contents of the Offset record 1604 within the current PCTTBL entry 1602 (this Offset value indicating the offset from the beginning of the cycle to the beginning of the microinstruction to be edited) to index from the beginning of the current cycle (contained in the working pointer wc_iptr set up by block 1710); and by indexing with a further offset from the beginning of the microinstruction to the beginning of the microinstruction field to be replaced (this further offset depends upon whether the field to be edited is a Jump Limit, Clock, XGrad, YGrad or ZGrad field). The resulting pointer points to the beginning of a particular microinstruction field of a specific microinstruction within the memory buffer (232, 234) to be edited. The Fast Linker overwrites this microinstruction field with the obtained, formatted PCT value (since different microinstruction fields have different lengths, the number of bits to be overwritten also depends on whether the field to be edited is a Jump Limit, Clock, XGrad, YGrad or ZGrad field). The use of stored offsets for indexing into the microcode buffers (232, 234) provides high speed editing of the micro-instructions.

After the PCT value has been inserted as described above, the pointer initialized by block 1722 is updated to the next entry of the PCTTBL data structure 1600, and blocks 1724–1752 are repeated until the last entry of the PCTTBL data structure has been encountered (decision block 1724). Thus, the PCTTBL data structure 1600 may include multiple entries 1602 for the same PCT value—causing this same value to be inserted into multiple microinstructions within a given cycle section 269.

The current cycle counter is updated, and wc_iptr is updated to point to the next cycle (block 1755) and then the Fast Linker determines whether the current half-page is done being edited (decision block 1756), and whether there are more cycles to link (decision block 1758).

If the current half-page is not yet done being edited (decision block 1756), blocks 1720–1760 are repeated to inset all appropriate PCT values into all appropriate microinstruction fields within the next cycle. If the current half-page is done being edited, the Fast Linker determines whether the second half-page has been linked but linking is still not complete (decision block 1758). If this is the case, the instruction pointer wc_iptr is updated to include the conditional branch instruction 265 and STOP instruction 266 (see FIG. 5A) at the end of the microcode template. The page template data structure 1650 is then updated with the ending cycle (block 1760). The Fast Linker determines whether linking is completed (decision block 1761) and if so overwrites a STOP instruction at the beginning of the next cycle, updating pointer wc_iptr in the process (block 1762). The Fast Linker then starts the DMA of the current half-page into sequencer WCS 150 after using pointer wc_iptr to compute the transfer count (block 1764). This DMA process can occur while the Fast Linker is busy editing the other half-page since the VMS operating system is provided with a memory buffer pointer and transfer count and performs the DMA in parallel with other computer operations.

Meanwhile, the Fast Linker determines whether it has another half-page of microcode to edit (decision block 1766). If there is no more microcode in the memory buffer to edit (either because both half-pages have already been edited, or because linking has been completed, the function "lk_tmplt" returns to the calling process (block 1770). Otherwise, the Fast Linker continues with the other half-page and repeats blocks 1720–1766 so as to link and load that half-page.

Referring once again to FIG. 6B, once the initial Page 0 has been linked and loaded (block 1526), the Fast Linker updates the page state in data structures 1650, 1670 (block 1528), and sends a READY message to the client process executing on host processor 126 (block 1530). Upon receiving a responsive GO message from the client process (block 1530), the Fast Linker starts the sequencer executing Page 0 of WCS 150 (block 1532). The Fast Linker then enters the "link and load" loop (blocks 1534–1548)—where it remains until sequencer 140 finishes executing the microcode specified by the last Link and load command. Sequencer 140 is continually executing during the time the Fast Linker repetitively executes the "link and load" loop shown on FIG. 6C, and this loop has the effect of continually linking microcode for and continually loading this linked microcode into the sequencer writable control store 150.

At block 1534, the Fast Linker waits until the sequencer is not executing the page of WCS 150 that is next to be loaded (the first time through this "link and load" loop, the sequencer 140 will be executing Page 0 and the next page to be loaded will be Page 1, so this test will pass without any waiting). The Fast Linker then writes to the sequencer 140 Control Status Register to specify the next page to be written (block 1536), and links and loads that page (block 1538) using the page template contained within the appropriate memory buffer (232, 234). As will be understood, block 1538 is performed by calling the function "lk_tmplt" described above in connection with FIGS. 6D–6F and block 1526. The Fast Linker then waits for the DMA process begun by block 1764 to complete (block 1540), and gates the sequencer 140 to allow execution to proceed from the current page to the page just loaded (block 1542). This gating is accomplished by writing a bit to the sequencer 140 Control Status Register, this bit being used to gate the conditional branch instruction at the end of the current page being executed (see FIG. 5, microinstructions 265, 266)—although under normal operating conditions within a given pulse sequence in the preferred embodiment, the sequencer 140 never actually waits on this gating even but instead branches to the next page with substantially no interruption. The Fast Linker then again updates the page template data structure 1650 and the sequencer state data structure 1670

(block 1544) and changes the page number to be loaded (block 1546).

The Fast Linker then tests (e.g., based on parameters passed to it by the "lk_tmplt" function) whether there is more microcode to link and load (decision block 1548). The loop of blocks 1534–1548 is continually executed until there is no more microcode to link and load (i.e., until all of the microcode requested by the last Linker Control Statement has been generated and provided to sequencer 140). If there are additional Link commands to execute (e.g., to provide alternate "levels" of microcode; decision block 1550), then control returns to block 1512 so as to link and load additional microcode in response to such additional link commands. Otherwise, the Fast Linker simply waits for the sequencer 140 to finish executing the pulse sequence (or for the client process to send a reset message; block 1552), and then resets sequencer 1554 and sends a DONE message to the client process (block 1556) before returning to the calling process (block 1558).

IV. Suitable Continually Loadable Sequencer

Copending, commonly-assigned application Ser. No. 07/571,258 of Zeilenga et al filed 23 Aug. 1990 entitled "CONTINUALLY LOADABLE MICROCODE STORE FOR MRI CONTROL SEQUENCERS" (Attorney Docket No 89-108), now issued U.S. Pat. No. 5,144,242 (hereby expressly incorporated by reference herein) describes in great detail the structure and operation of an exemplary continually loadable microcode sequencer of the type suitable for use in conjunction with the Fast Linker provided by the present invention. For sake of completeness, a brief description of this suitable control sequencer is set forth below (the reader is referred to that copending Zeilenga et al application for a more complete description).

Figure 8:
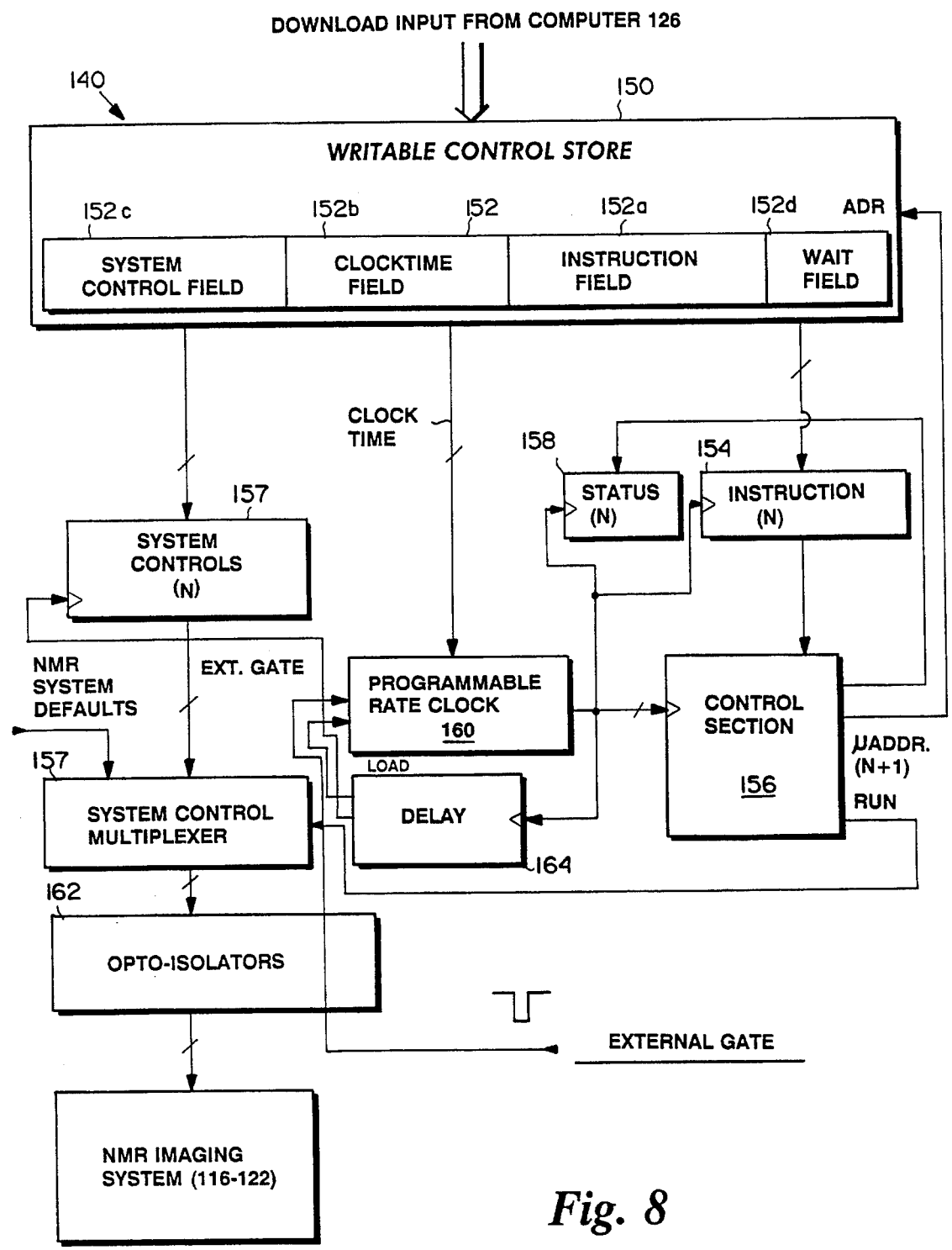
FIG. 8 is a high level schematic block diagram of a continually loadable sequencer shown in FIG. 2 of the type suitable for use in cooperation with the preferred embodiment Linker.

FIG. 8 is a high level block diagram of the architecture of the sequencer 140 shown in FIG. 2 of the type suitable for use with the preferred Linker provided by the present invention. This FIG. 8 design is based on a conventional pipelined bit-slice CPU architecture but includes some significant enhancements which optimize the architecture for NMR pulse sequencing (and also provides continual loading of the writable control store 150).

Sequencer 140 shown in FIG. 8 (which may be characterized as a state machine) includes a writable control store ("WCS") 150, a pipeline register (154,157,158), a control section 156, a system control multiplexer 157, and a programmable rate clock 160.

Control store 150 in the preferred embodiment includes a random access memory (RAM) the contents of which can be continually loaded by host processor 126 so as to contain a desired microprogram.

Exemplary micro-instructions each occupy the entire width of the WCS 150 at a corresponding address. The micro-instructions (an exemplary abbreviated format for which is shown at 152) each include an instruction field 152a, a clock time field 152b, and a system control field 152c and a WAIT field 152d.

The micro-instruction field 152a preferably contains an operational code or equivalent that controls state branching by the sequencer. For example, micro-instruction field 152a may contain a branch "op code" (e.g., "continue," unconditional jump, or conditional jump) and associated relative or absolute address information specifying a branch address of WCS 150 to branch to.

This micro-instruction field 152a is latched by pipeline register 154, which is composed of an input latch and output register. Pipeline register 154, 157 and 158 hold the current sequencer state N. The next state is addressed by the control section 156 as soon as possible after the state transition to state N if the duration of N is 250 ns. State N+1 is present at the output of the writable control store 150 within 250 nsec. If state N has a duration of only 250 nsec, then the pipeline register is loaded with state N+1 immediately due to an output from programmable rate clock 160. If state N lasts longer than 250 nsec., then the pipeline output register is not loaded immediately.

At the end of a state (N) in the preferred embodiment sequencer 140, a state change is initiated to cause the new current (N+1th) instruction field 152a to be stored within pipeline instruction register 154. The control section 156 then addresses a next (N+2) micro-instruction stored within WCS 150 immediately if the duration of the new current instruction is 250 ns. Control section 156 decodes the instruction contained within register 154 at the end of state N+1 and generates the address of a next (N+2) micro-instruction to be fetched. Control section 156 applies the address to WCS 150 to immediately fetch the next (N+2) micro-instruction. The next micro-instruction (N+2) is thus available at the output of WCS 150 and is latched by pipeline register 154 after the now-current state (N+1) ends.

The different fields 152a–d of the (N+1th) instruction are applied to different portions of the sequencer 140. For example, the system control field 152c is applied to system control multiplexer 157 so as to control various portions of the imaging system 116–122; the clock time field 152b is latched into programmable rate clock 160; and the WAIT field 152d is latched into control section 156.

The system control field 152c of micro-instruction format 152 contains control information for controlling various aspects of NMR system 100. System control multiplexer 157 selects, during periods of inactivity, NMR system default signals to prevent damage to the system and otherwise selects output signals provided by the current micro-instruction. The selected output signals are applied (via opto-isolators 162) to control various aspects of the NMR system (e.g., RF pulse ON/OFF state and RF frequency, the magnitudes of X, Y and Z magnetic field gradients, etc.).

In performing an NMR pulse sequence, speeds on the order of those needed in CPUs are almost never encountered. However, sequencer 140 must be capable of producing highly repeatable and simultaneous sequences of a large number of multi-bit control fields at highly precise timings. The timing resolution is especially critical (e.g., a resolution of on the order of 250 ns is desirable) and timing must also be adjustable over a wide range (e.g., 250 ns to 8 seconds). In the design shown in FIG. 8, these timing requirements are met by storing in each instruction a 15-bit clock time (within field 152b) along with a single bit scaler select value. The contents of clock time field 152b are applied to control programmable rate clock block 160, which in turn provides timing signals to control the timing of control section 156 and other portions of sequencer 140. Programmable rate clock block 160 very precisely times a delay having a duration responsive to the contents of clock time field 152b, this time delay controlling the duration of the current state (corresponding to the current—that is, the Nth—instruction).

In order to permit the micro-instruction clock time field 152b to contain timing information associated with execution of the (current) instruction in which the field appears, it is necessary to load programmable clock block 160 and system control block 157 for the next instruction N+1 a short delay time after control section 156 generates micro-address N+1. Registers 154, 156 delay the instruction field 152a and the status information for the current (Nth) instruction until the programmable rate clock block 160 processes clock time field 152b for the current instruction. A delay block 164 introduces a suitable delay for loading programmable rate clock 160 with the contents of clock time field 152b to ensure that the programmable rate clock is loaded a short delay time after the next state micro-address (N+1) is generated by control section 156.

Micro-instruction sequences typically include micro-instructions of various different types. Most micro-instructions will have an instruction field corresponding to "CONTINUE," and will include a system control field 152c specifying the control states of the various portions of the NMR system (e.g., RF transmitter on/off, gradient magnet intensities, etc.) and a clock time field 152b specifying the duration of that sequencer state (i.e., how long the NMR system is to maintain the particular control settings specified by control field 152c). Some micro-instructions may specify a conditional or unconditional branch to another micro-instruction, and some may specify a WAIT (externally gated) state.

Figure 9:
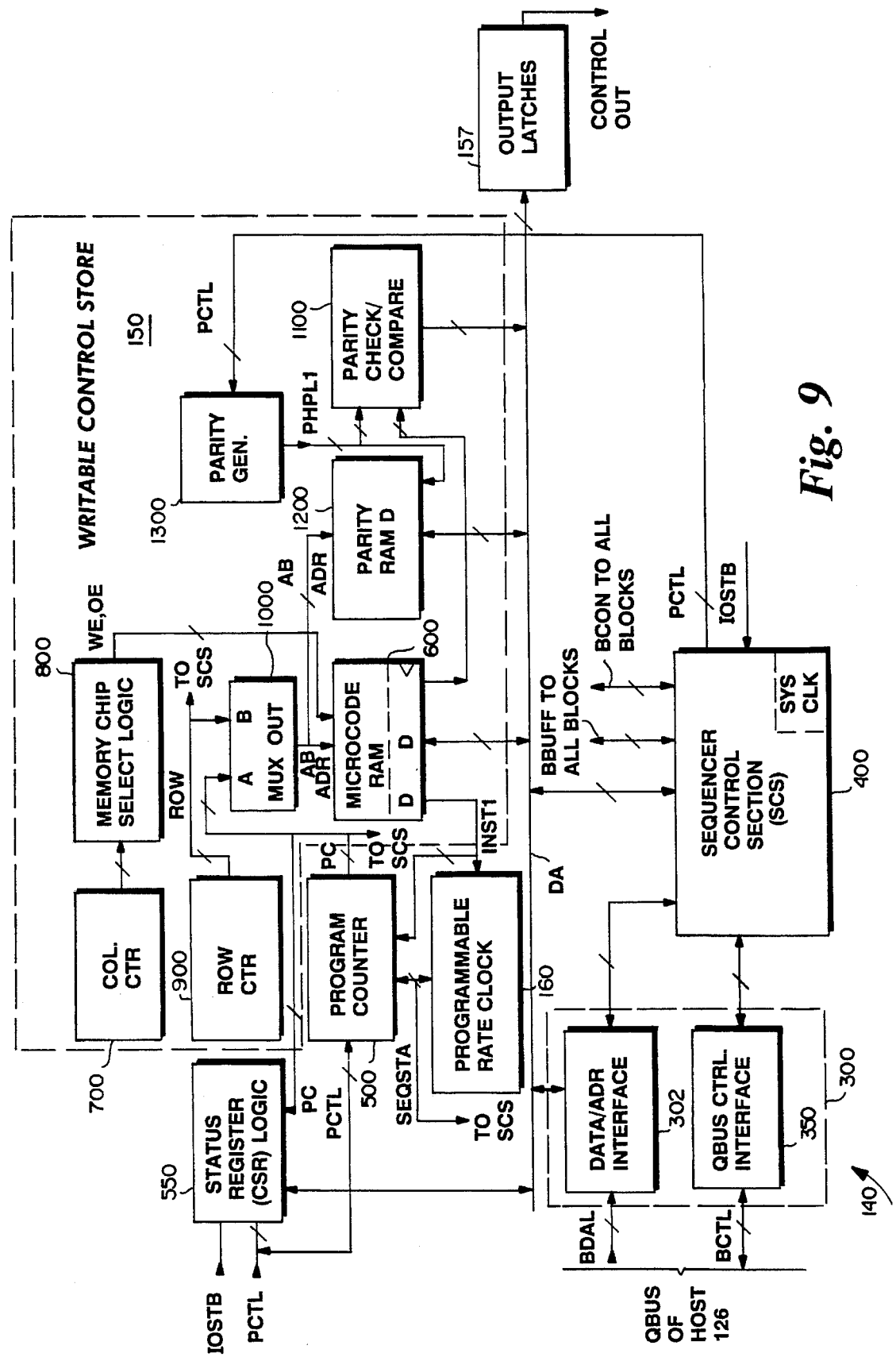
FIG. 9 is a more detailed schematic diagram of the suitable continually loadable sequencer shown in FIG. 8.

FIG. 9 is block diagram of the portions of an overall, exemplary preferred architecture of sequencer 140 shown in FIG. 5 relevant to loading and other access to the sequencer microcode writable control store (WCS) 150. Briefly, sequencer 140 as shown in FIG. 9 includes WCS 150, a host bus interface 300, a control section 400, programmable rate clock 160, a program counter 500, output latches 157, and a read status logic block 550. Various internal busses (including an internal multiplexed data/address bus DA, an internal control bus BCON, and a further internal bus BBUF) provide data, control and other signal paths between the various components of sequencer 140.

Sequencer 140 interfaces with the peripheral bus of host processor 126 via host bus interface 300. In the preferred embodiment, host processor 126 is a VAX general purpose digital computer manufactured by Digital Equipment Corporation (DEC), Maynard, Mass., and the host bus configuration and protocol correspond to the "Q22" QBUS standards promulgated by DEC. Host bus interface 300 provides an interface for this conventional Q bus, including an address/data interface 302 and a control signal interface 350. Host bus interface 300 communicates principally with sequencer control section 400, although it also has direct access to sequencer internal data/address bus DA.

The host processor 126 QBUS is a conventional 16-bit multiplexed data/address bus exhibiting a 10 μs time-out, and communicates with its peripherals using standard DEC signalling protocol. As those skilled in the art well know, detailed information about the structure, operation and protocols of this QBUS may be found in standard publications of DEC. Briefly, host processor 126 writes to sequencer by asserting a write control signal along with a 16-bit address within the sequencer memory space; and then by asserting data to be written to the specified sequencer memory location. The host processor 126 will continue to assert the data until either: (a) the bus times out (10 μs later), or (b) the sequencer asserts an acknowledgement signal "BRPLY"—at which time the host bus cycle terminates. Sequencer 140 communicates with host processor 126 (and receives data for loading into WCS 150) via this QBUS using standard DEC protocol.

If the host attempts to write to WCS 150 at the same time that sequencer 140 needs to read from the WCS, the sequencer simply extends the host bus cycle (i.e., by waiting until the data has been written before asserting the acknowledgement signal). Thus, in the preferred embodiment there is no need to buffer much data from the QBUS; rather, each word of data from the QBUS is simply latched (by a single word latch in the preferred embodiment) and written directly into WCS 150 at a time selected by the sequencer control section 400. Sequencer 140, in the preferred embodiment, extends the host bus cycle until the write has actually been completed by delaying transmission of the acknowledge signal protocol required for the host bus cycle to complete.

Sequencer control section (SCS) 400 in the preferred embodiment provides synchronization and control signals for the remainder of sequencer 140. One of the blocks intimately coupled to SCS 400 is a 15-bit auto-increment program (location) counter 500 that applies addresses to WCS 150 specifying locations containing micro-instructions to be executed by sequencer 140 (with the most significant bit A14 of the program counter address selecting between pages of WCS 150 in the preferred embodiment). Program counter 500 is incremented (or, alternatively, loaded in parallel from the micro-instruction instruction field 152a) at a time determined by the output of programmable rate clock (i.e, indicating the end of the current state) so as to fetch the micro-instruction corresponding to a next state from WCS 150. As explained previously, a pipeline register (154,158 in FIG. 8, and shown in FIG. 9 as a latched output of RAM 600) is used to hold the "next state" micro-instruction.

Host processor 126 can read and write to WCS 150. When host processor 120 reads from sequencer 140 it may also read a 16-bit status word generated by read status logic block 550. The status word provided by read status logic block 550 includes such information as the current page of WCS (1 or 0) being accessed by the sequencer, various error condition signals (e.g., indicating that the host attempted to write to the same page of WCS 150 as the sequencer 140 was reading from), and parity error related signals.

WCS 150 in the preferred embodiment provides most of the components of sequencer 140. The heart of WCS 150 is a static, very fast random access memory (RAM) array 600 comprising 32,768 words (with each word having a width corresponding to the width of the micro-instruction format). WCS 150 also includes various memory addressing functional blocks, such as a column counter 700 and associated memory chip select logic 800; a row counter 900; an address multiplexer 1000; and parity-related components 1100, 1200, 1300.

Parity-related components 1100–1300 within WCS 150 ensure that no errors occur during reading from the WCS. Memory address multiplexer 1000 selects between access of WCS 150 by host processor 126 (via row counter 900 and column counter 700) and access of the WCS by sequencer 140 (via program counter 500).

Since the host processor QBUS data path is sixteen bits wide, the RAM 600 memory array must be accessed and written to in 16-bit wide portions when it is being loaded by host processor 126. Thus, for purposes of loading, RAM 600 is accessed two 8-bit RAM chips at a time (each "unit" of the memory thus comprises two RAM chips providing a 16-bit wide block)—and host processor 126 thus writes into a sequence of multiple (e.g., N) 16-bit wide "columns" of a row before moving on to the next row. For purposes of writing to RAM 600 from the host processor 126 QBUS, column counter 700 and associated memory chip select logic 800 generates a sequence of control signals /WE, /OE (in this specification, a negative logic signal is indicated by the symbol "/" preceding the signal name) in order to select "columns" of the RAM array—and row counter 900 provides an auto-increment row address count (auto-increment is in response to a "carry out" from column counter 700 in the preferred embodiment) for selection of an ascending address order sequence of rows of RAM 600.

To begin a write to sequencer 140, host processor 126 simply addresses the sequencer and then applies to the bus an appropriate number (e.g., 32K×N) 16-bit words (where N is the width of the sequencer micro-instruction divided by 16) in an appropriate order (as predetermined beforehand by the correspondence between the organization of columns of RAM 600 with the micro-instruction output fields 152). Sequencer 140 automatically writes the transmitted words into RAM 600 (e.g., beginning at the "top" of a page of RAM and proceeding toward the "bottom" of the page) such that a maximum of one page of RAM is filled. Writing to RAM 600 is not truly "continuous" in the sense of being "uninterrupted"—since sequencer 140 if it is running, may from time to time extend a QBUS write cycle for one or more 250 ns sequencer micro-instruction cycle times while the sequencer takes priority to access WCS 150.

Sequencer 140 assumes that host processor 126 will always send down up to one full page of data (if the entire page is not needed, the unused space may be buffered with data that will not, if accidentally executed, cause undesired sequencer output states to occur). The host 126 may send down in excess of one full page of data—but an error condition will arise if this occurs while the sequencer is running.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a magnetic resonance imaging system of the type including a magnetic field generator, an RF field generator, an RF receiver, a data acquisition subsystem, and a control sequencer, said magnetic field generator and said RF field generator cooperating to stimulate nuclear magnetic resonance phenomena within an object to be imaged, said RF receiver receiving NMR signals produced by said nuclear magnetic resonance phenomena, said data acquisition subsystem acquiring digitized signals, said control sequencer controlling at least one of said magnetic field generator, said RF field generator and said data acquisition subsystem, said control sequencer having a control store for storing and accessing instructions for execution, a method of efficiently and rapidly generating instructions for execution by said control sequencer,
said method comprising:

(a) generating a sequencer control store memory image including sequencer instructions, said instructions including first parameters that define a first projection;

(b) loading said sequencer control store memory image, including said first projection parameters, into said sequencer control store;

(c) executing, with said sequencer, said sequencer control store memory image loaded into said sequencer control store by said loading step (b);

(d) controlling, with said sequencer, said magnetic field generator and/or said RF field generator in response to execution of said sequencer control store memory image by said executing step (c) so as to stimulate nuclear magnetic resonance phenomena within said object;

(e) acquiring, with said RF receiver and said data acquisition subsystem, first NMR signals emitted by said nuclear magnetic resonance phenomena stimulated by said controlling step (d);

(f) reusing said sequencer control store memory image by rapidly replacing said first projection parameters within said sequencer control store memory image with second projection parameters defining a second projection to create an altered sequence control store memory image, and loading said altered sequencer control store memory image, including said second projection parameters, into said sequencer control store;

(g) executing, with said control sequencer, said altered sequencer control store memory image loaded by said reusing step (f);

(h) controlling, with said sequencer, said magnetic field generator and/or said RF field generator in response to execution of said altered memory image by said executing step (g) so as to stimulate nuclear magnetic resonance phenomena within said object;

(i) acquiring, with said RF receiver and said data acquisition subsystem, second NMR signals emitted by said nuclear magnetic resonance phenomena stimulated by said controlling step (h); and (j) generating an image of said object based at least in part on said first and second NMR signals acquired by said steps (e) and (i).

2. A method as in claim 1 wherein said executing step (c) includes executing microcode loaded by said loading step (b), and said reusing step (f) is performed subsequently to said executing step (c).

3. A method as in claim 1 wherein:

said loading step (b) includes the step of loading said memory image into an addressable memory space provided by said sequencer control store; and said reusing step (f) includes the step of rewriting said control store with said altered memory image.

4. A method as in claim 1 wherein said generating step (a) includes storing and maintaining said memory image in a host memory buffer; and said reusing step (f) comprises the step of editing said memory image in place in said host memory buffer.

5. A method as in claim 1 wherein said generating step (a) comprises storing a linked microcode memory image in a buffer, and said loading step (b) comprises loading said stored linked microcode memory image from said buffer into said control sequencer control store.

6. A method as in claim 1 wherein:

said generating step (a) includes:
defining an outer loop index value, and
specifying, within said memory image, plural physical addresses in dependence on said outer loop index value, and said reusing step (f) comprises keeping constant the physical addresses within said memory image that are dependent on said outer loop index value.

7. A method as in claim 1 wherein:

said generating step (a) includes providing, within said memory image, at least one jump address to another location within said memory image, and said reusing step (f) includes offsetting said jump address.

8. A method as in claim 1 wherein:
said generating step (a) includes providing, within said memory image, at least one jump address to a subroutine, and
said reusing step (f) includes maintaining said jump address constant.

9. A method as in claim 1 wherein said generating step (a) includes:
providing a Linker command defining an outer loop index, and
resolving Linker command nested loop dependent PCT parameter references except for PCT and other command references dependent on the outer loop index of the Linker command.

10. A method as in claim 1 wherein:
said generating step (a) comprises defining a Linker outer loop, defining a microcode image for at least a first page of the sequencer control store memory corresponding to a first part of the Linker outer loop, and identifying and resolving outer loop dependent microcode fields, and
said reusing step (f) includes reusing said microcode image for at least a second page of the control sequencer control store corresponding to at least one successive part of the Linker outer loop, and altering at least some of said outer loop dependent microcode fields.

11. A method as in claim 1 wherein said generating step (a) includes creating an instruction block, creating at least one data structure locating instructions within said instruction block that contain references dependent on an outer loop index, and repetitively copying said instruction block to form said memory image, said copying step including using said data structure to resolve at least those references dependent on said outer loop index.

12. A method as in claim 11 wherein said generating step (a) further includes storing, within said data structure, at least one address offset locating said instructions from the beginning of the block.

13. A method as in claim 11 wherein said generating step (a) further includes storing, within said data structure, at least one microcode field and at least one corresponding reference to be resolved.

14. A method as in claim 1 wherein said generating step (a) includes:
(1) linking a first main outer loop dependent block of microcode, and
(2) subsequently to said step (1), creating a template of the memory image for a first page of said sequencer control store by copying said microcode block repetitively to provide contiguous blocks of higher memory while changing addresses for jump instructions which refer to other instructions within said contiguous blocks.

15. A method as in claim 14 wherein said generating step (a) further includes placing within said first page a jump instruction to a second page of said sequencer control store if more than one page of microcode is required.

16. A method as in claim 14 wherein said generating step (a) further includes placing a stop instruction within said first page if more than one page of microcode is not required.

17. A method as in claim 14 wherein said generating step (a) further includes:
(x) defining at least one subroutine as part of said memory image; and
(y) creating a further template of a further memory image for a second page of said sequencer control store by copying said subroutine and the first main loop dependent block from said template of the memory image for said first page to a second memory image template while changing addresses of said jump instructions to reflect at least one physical address of the second page of said sequencer control store, to provide a second main loop dependent block.

18. A method as in claim 17 wherein said creating step (y) further includes repetitively copying said second main loop dependent block to higher contiguous addresses in the second memory image template while changing addresses therein to reflect said higher contiguous addresses.

19. A method as in claim 17 wherein said creating step (y) further includes placing, within said second memory image template, a jump instruction to said first sequencer control store page if more than two pages of microcode are needed.

20. A method as in claim 17 wherein said creating step (y) further includes placing a stop instruction within said second memory image template if more than two pages are not needed.

21. A method as in claim 1 wherein said generating step (a) comprises:
(1) creating a data structure containing entries referencing instructions that contain projection dependent values, and
(2) reading said data structure entries and successively resolving said projection dependent values by supplying said first projection parameters based at least in part on said data structure entries using at least one outer loop index value.

22. A method as in claim 1 wherein said rapidly replacing step is performed, at least in part, concurrently with said executing step (c).

23. A method as in claim 1 wherein said generating step (a) comprises storing said memory image in a computer memory, and said loading step (b) comprises copying said image from said computer memory to said control store.

24. A magnetic resonance imaging system for generating an image of an object, said system including:
a magnetic field generator;
an RF field generator cooperating with said magnetic field generator to stimulate nuclear magnetic resonance phenomena within said object;
a data acquisition subsystem for acquiring digitized NMR signals;
a control sequencer for controlling at least one of said magnetic field generator, said RF field generator and said data acquisition subsystem, said control sequencer having a control store for storing and accessing instructions for execution by said sequencer;
a host computer including a computer memory, said host computer performing the following functions:
(a) generating a first block of sequencer instructions including first parameters that define a first projection,
(b) storing said first block of sequencer instructions within said computer memory,
(c) loading said first block of sequencer instructions, including said first projection parameters, into said sequencer control store,
(d) rapidly altering said first block of instructions stored within said computer memory by maintaining said first block but replacing said stored first projection parameters with second projection parameters defining a second projection, and (e) loading said altered first block of sequencer instructions, including said second projection parameters, into said control sequencer control store;

said sequencer including a processor that executes said first block of sequencer instructions and said altered first block of sequencer instructions out of said sequencer control store, and controls said magnetic field generator and/or said RF field generator in response to said execution so as to stimulate nuclear magnetic resonance phenomena within said object, said stimulated phenomena generating NMR signals;

a receiver and said data acquisition subsystem cooperating to receive and acquire at least first NMR signals corresponding to said first projection and second NMR signals corresponding to said second projection; and a display coupled to said data acquisition subsystem that generates an image of said object based on said acquired first and second NMR signals.

25. Apparatus as in claim 24 wherein said block of instructions specifies at least one sequencer control store physical address.

26. Apparatus as in claim 24 wherein said first parameters comprise MRI cycle and/or slice dependent values.

27. Apparatus as in claim 24 wherein said host computer includes means for (a) loading said block of instructions into said control sequencer control store, and (b) subsequently loading said altered block of instructions into said control sequencer control store.

28. Apparatus as in claim 24 wherein said host computer includes means for overwriting, with said altered block of instructions, said block of instructions loaded into said control sequencer control store.

29. A system as in claim 24 wherein said host computer includes:

means for defining an outer loop index value, means for specifying, within said first block, plural physical addresses in dependence on said outer loop index value, and means for keeping constant, during said rapidly altering operation, the physical addresses within said first block that are dependent on said outer loop index value.

30. A system as in claim 24 wherein said host computer includes:

means for providing, within said first block, at least one jump address to another location within said first block, and means for offsetting said jump address during said rapidly altering operation.

31. A system as in claim 24 wherein said host computer includes:

means for providing, within said first block, at least one jump address to a subroutine, and means for maintaining said jump address constant during said rapidly altering operation.

32. A system as in claim 24 wherein said host computer comprises:

means for providing a Linker command defining an outer loop index, and means for resolving Linker command nested loop dependent PCT parameter references except for PCT and other command references dependent on the outer loop index of the Linker command.

33. A system as in claim 24 wherein said host computer comprises:

means for defining a Linker outer loop, defining with said first block a microcode image for at least a first page of the sequencer control store memory corresponding to a first part of the Linker outer loop, and identifying and resolving outer loop dependent microcode fields, and means for reusing said microcode image for at least a second page of the control sequencer control store corresponding to at least one successive part of the Linker outer loop, and altering at least some of said outer loop dependent microcode fields.

34. A system as in claim 24 wherein said host computer includes means for creating at least one data structure locating instructions within said first instruction block that contain references dependent on an outer loop index, and means for repetitively copying said first instruction block to form a memory image, said copying means including means for using said data structure to resolve at least those references dependent on said outer loop index.

35. A system as in claim 34 wherein said host computer further includes means for storing, within said data structure, at least one address offset locating said instructions from the beginning of the first instruction block.

36. A system as in claim 34 wherein said host computer further includes means for storing, within said data structure, a microcode field and at least one associated reference to be resolved.

37. A system as in claim 24 wherein said host computer includes:

means for linking a first main outer loop dependent block of microcode, and means for creating a template of the memory image for a first page of said sequencer control store by copying said microcode block repetitively to provide contiguous blocks of higher memory while changing addresses for jump instructions which refer to other instructions within said contiguous blocks.

38. A system as in claim 37 wherein said template creating means includes means for placing within said first page a jump instruction to a second page of said sequencer control store if more than one page of microcode is required.

39. A system as in claim 37 wherein said template creating means includes means for placing a stop instruction within said first page if more than one page of microcode is not required.

40. A system as in claim 37 wherein said host computer further includes:

means for defining at least one subroutine as part of said memory image; and means for creating a further template of a further memory image for a second page of sequencer control store by copying said subroutine and the first main loop dependent block from a first memory image template to a second memory image template while changing addresses of all jump instructions to reflect at least one physical address of the second page of said sequencer control store, to provide a second main loop dependent block.

41. A system as in claim 40 wherein said creating means includes means for repetitively copying said second main loop dependent block to higher contiguous addresses in the second memory image template while changing addresses to reflect said higher contiguous addresses.

42. A system as in claim 40 wherein said creating means includes means for placing, within said second memory image template, a jump instruction to said first sequencer control store page if more than two pages are needed.

43. A system as in claim 40 wherein said creating means includes means for placing a stop instruction to said first sequencer control store page within said second memory image template if more than two pages are not needed.

44. A system as in claim 24 wherein said host computer comprises:
   means for creating a data structure containing entries referencing instructions that contain projection dependent values, and
   means for reading said data structure entries and successively resolving said projection dependent values by supplying said first projection parameters based at least in part on said data structure entries using at least one outer loop index value.

45. In a magnetic resonance imaging system for imaging an object, said system including:
   (i) a magnetic field generator,
   (ii) an RF field generator,
   (iii) a data acquisition subsystem,
   (iv) a digital sequencer coupled to said magnetic field generator, said RF field generator, and said data acquisition subsystem, said sequencer including a sequencer memory for storing instructions,
   (v) an RF receiver,
   (vi) a display device, and
   (vii) a digital computing arrangement coupled to said sequencer, said digital computing arrangement including a buffer,
a method of efficiently generating and supplying instructions to said sequencer memory comprising the following steps:
   (A) storing a set of sequencer instructions in said buffer;
   (B) generating a first set of projection-specific parameters corresponding to a first plurality of slices of said object;
   (C) writing said first set of projection-specific parameters into said buffer as parameters for at least some of said set of stored sequencer instructions;
   (D) copying said stored sequencer instructions including said first set of slice-specific parameters from said buffer to said sequencer memory;
   (E) executing said instructions including said first set of slice-specific parameters with said sequencer from said sequencer memory to control at least one of said magnetic field generator and said RF field generator;
   (F) receiving NMR signals corresponding to said first plurality of slices of said object with said RF receiver and digitizing them with said data acquisition subsystem;
   (G) generating a further set of slice-specific parameters corresponding to a further plurality of slices of said object;
   (H) reusing said set of said stored sequencer instructions by: (h1) replacing said first set of stored projection specific values with said further set of projection specific values, and (h2) copying said set of sequencer instructions including said further set of projection specific parameters from said buffer to said sequencer memory;
   (I) executing said instructions copied by said reusing step (H) including said further set of projection specific parameters from said sequencer memory with said sequencer to control at least one of said magnetic field generator and said RF field generator;
   (J) receiving NMR signals corresponding to said further plurality of slices with said RF receiver and said data acquisition subsystem; and
   (K) generating, on said display device, an image based on said received NMR signals.

46. A method as in claim 45 wherein:
   said method further includes defining an outer loop index value, and specifying, within said stored sequencer instructions, plural physical addresses in dependence on said outer loop index value, and
   wherein said reusing step (H) comprises keeping constant the physical addresses within said stored sequencer instructions that are dependent on said outer loop index value.

47. A method as in claim 45 wherein:
   said storing step (A) includes storing, within said buffer, an instruction having at least one jump address to another instruction within said buffer and
   said reusing step (H) includes offsetting said jump address.

48. A method as in claim 45 wherein:
   said storing step (A) includes storing, within said buffer, an instruction having at least one jump address to a subroutine, and
   said reusing step (H) includes maintaining said jump address constant.

49. A method as in claim 45 further including:
   providing a Linker command defining an outer loop index, and
   resolving Linker command nested loop dependent PCT parameter references except for PCT and other command references dependent on the outer loop index of the Linker command.

50. A method as in claim 45 wherein:
   said method further comprises defining a Linker outer loop, defining a microcode image for at least a first page of the sequencer control store memory corresponding to a first part of the Linker outer loop, said step (A) storing said image in said buffer, and identifying and resolving outer loop dependent microcode fields, and
   said reusing step (H) includes reusing said microcode image stored in said buffer for at least a second page of the control sequencer control store corresponding to at least one successive part of the Linker outer loop, and altering at least some of said outer loop dependent microcode fields.

51. A method as in claim 45 wherein said method further includes creating an instruction block, creating at least one data structure locating instructions within said instruction block that contain references dependent on an outer loop index, and wherein said step (A) comprises repetitively copying said instruction block into said buffer, said copying step including using said data structure to resolve at least those references dependent on said outer loop index.

52. A method as in claim 51 further including storing, within said data structure, at least one address offset locating said instructions from the beginning of the block.

53. A method as in claim 51 further including storing within said data structure the microcode field and at least one reference to be resolved.

54. A method as in claim 45 further including:
   (1) linking a first main outer loop dependent block of microcode, and
   (2) subsequently to said step (1), creating a template of the memory image for a first page of said sequencer control store by copying said microcode block repetitively to provide contiguous blocks of higher memory while changing addresses for jump instructions which refer to other instructions within said contiguous blocks, wherein said storing step comprises storing said template in said buffer.

55. A method as in claim 54 further including placing within said first page a jump instruction to a second page of said sequencer control store if more than one page of microcode is required.

56. A method as in claim 54 further including placing a stop instruction within said first page if more than one page of microcode is not required.

57. A method as in claim 54 further including:

(x) defining at least one subroutine as part of a memory image; and (y) creating a further template of a further memory image for a second page of sequencer control store by copying said subroutine and the first main loop dependent block from a first memory image template to a second memory image template while changing addresses of all jump instructions to reflect at least one physical address of the second page of said sequencer control store, to provide a second main loop dependent block.

58. A method as in claim 57 wherein said creating step (y) further includes repetitively copying said second main loop dependent block to higher contiguous addresses in the second memory image template while changing addresses to reflect said higher contiguous addresses.

59. A method as in claim 57 wherein said creating step (y) further includes placing, within said second memory image template, a jump instruction to said first sequencer control store page if more than two pages are needed.

60. A method as in claim 57 wherein said creating step (y) further includes placing a stop instruction to said first sequencer control store page within said second memory image template if more than two pages are not needed.

61. A method as in claim 21 further including:

(1) creating a data structure containing entries referencing instructions that contain projection dependent values, and (2) reading said data structure entries and successively resolving said projection dependent values by supplying said first projection parameters based at least in part on said data structure entries using at least one outer loop index value.

62. In a magnetic resonance imaging system including:

a magnetic field generator;

an RF field generator cooperating with said magnetic field generator to stimulate nuclear magnetic resonance phenomena within an object to be imaged;

a control sequencer for controlling in real time at least one of said magnetic field generator and said RF field generator, said control sequencer including a control store for storing and accessing instructions for execution by said sequencer;

an RF receiver for receiving NMR signals;

a data acquisition subsystem; and a display that displays an image based at least in part on said received NMR signals, a method of linking microcode for execution by said control sequencer, said method comprising:

(1) creating a data structure having elements locating, within a first sequencer instruction block, at least one value dependent on an outer loop index;

(2) creating a first sequencer control store memory image template by successively copying said first instruction block;

(3) accessing said data structure elements;

(4) rapidly locating and resolving outer loop index dependent values within said first template based at least in part on said accessed data structure elements;

(5) creating a second sequencer control store memory image template by successively copying said first instruction block;

(6) rapidly locating and resolving outer loop index dependent values within said second template based at least in part on said accessed data structure elements;

(7) loading said first and second control store memory images into said sequencer control store;

(8) executing said loaded first and second control store memory images with said sequencer;

(9) controlling said magnetic and RF field generators based on said executing step to generate fields stimulating NMR phenomena within said object to be imaged;

(10) receiving NMR signals with said RF receiver;

(11) digitizing said received NMR signals with said data acquisition subsystems; and

(12) generating at least one image on said display based on said digitized received NMR signals.

63. A magnetic resonance imaging method comprising:

(1) providing a data structure having elements locating, within a first instruction block, at least one value dependent on an outer loop index;

(2) creating a first sequencer control store memory image template by replicating said first instruction block;

(3) rapidly locating within said first template and resolving outer loop index dependent values based at least in part on said data structure elements;

(4) creating a second sequencer control store memory image template by replicating said first instruction block;

(5) rapidly locating within said second template and resolving outer loop index dependent values based at least in part on said data structure elements;

(6) loading said first and second templates into a sequencer control store;

(7) executing instructions within said loaded templates with a sequencer coupled to said control store;

(8) controlling, in real time, generation of a magnetic field based on said sequencer execution;

(9) controlling, in real time, generation of an RF field based on said sequencer execution;

(10) receiving NMR signals generated in response to said magnetic and RF fields;

(11) acquiring and digitizing said received NMR signals, and

(12) displaying an image based at least in part on said digitized acquired NMR signals.

64. Magnetic resonance imaging apparatus comprising:

a main memory;

a sequencer having a control store;

means coupled to said main memory for generating a first block of sequencer instructions and for storing said first block within said main memory;

data structure generating means coupled to said main memory for creating a data structure having elements locating, within said first instruction block, at least one value dependent on an outer loop index;

replicating means coupled to said main memory for creating first and second sequencer control store memory image templates by replicating and storing, in said main memory, said first instruction block;

linking means, coupled to said main memory and coupled to receive said data structure, for rapidly locating within said first and second templates and resolving outer loop index dependent values based at least in part on said data structure elements to produce first and second sequencer memory images;

loading means coupled to said linking means for loading said first and second sequencer memory images into said sequencer control store, wherein said sequencer further includes:

executing means coupled to said control store for executing instructions within said first and second sequencer memory images loaded into said sequencer control store, means coupled to said executing means for controlling generation of a magnetic field based on said sequencer execution, and means coupled to said executing means for controlling generation of an RF field based on said sequencer execution, wherein said apparatus further comprises:

an RF receiver that receives NMR signals generated in response to said magnetic and RF fields;

a data acquisition subsystem that digitizes and acquires said received NMR signals; and a display coupled to said data acquisition subsystem for displaying an image based at least in part on said received digitized and acquired NMR signals.

* * * * *